(12) United States Patent
Ohsawa

(10) Patent No.: US 8,854,826 B2
(45) Date of Patent: Oct. 7, 2014

(54) SUSPENSION BOARD WITH CIRCUIT

(75) Inventor: Tetsuya Ohsawa, Osaka (JP)

(73) Assignee: Nitto Denko Corporation, Osaka (JP)

( * ) Notice: Subject to any disclaimer, the term of this patent is extended or adjusted under 35 U.S.C. 154(b) by 523 days.

(21) Appl. No.: 13/137,867

(22) Filed: Sep. 20, 2011

(65) Prior Publication Data

US 2012/0087041 A1 Apr. 12, 2012

Related U.S. Application Data

(60) Provisional application No. 61/344,833, filed on Oct. 20, 2010.

(30) Foreign Application Priority Data

Oct. 7, 2010 (JP) ................................ 2010-227592
Jul. 14, 2011 (JP) ................................ 2011-155499

(51) Int. Cl.
*H05K 1/00* (2006.01)
*G11B 5/48* (2006.01)

(52) U.S. Cl.
CPC .............. *G11B 5/486* (2013.01); *G11B 5/4853* (2013.01); *G11B 5/4826* (2013.01)
USPC ........... 361/749; 361/750; 361/782; 361/784; 361/816; 174/254; 174/258

(58) Field of Classification Search
USPC .......................... 361/749–750; 174/254–258; 360/244–249
See application file for complete search history.

(56) References Cited

U.S. PATENT DOCUMENTS

| | | | | |
|---|---|---|---|---|
| 5,699,212 A | * | 12/1997 | Erpelding et al. | 360/245.8 |
| 5,880,908 A | * | 3/1999 | Shiraishi et al. | 360/234.6 |
| 6,282,064 B1 | * | 8/2001 | Palmer et al. | 360/245.9 |
| 8,035,988 B2 | * | 10/2011 | Fontana et al. | 361/816 |
| 2009/0310908 A1 | * | 12/2009 | Kanagawa et al. | 385/14 |
| 2011/0096438 A1 | | 4/2011 | Takada et al. | |

FOREIGN PATENT DOCUMENTS

JP 2010-146631 7/2010

* cited by examiner

*Primary Examiner* — Tuan T Dinh
(74) *Attorney, Agent, or Firm* — Jean C. Edwards, Esq.; Edwards Neils PLLC

(57) ABSTRACT

A suspension board with circuit includes a conductive region in which a conductive layer is formed and a mounting region for mounting a slider on which a magnetic head that is electrically connected to the conductive layer is mounted. The mounting region mounts the slider so that the slider is capable of relatively moving with respect to the conductive region, and the conductive region includes an opposing region that is opposed to the slider in the thickness direction at the time of the relative movement of the slider with respect to the conductive region and a damage preventing portion for preventing damage to the opposing region by the slider.

10 Claims, 20 Drawing Sheets

FIG.7
(a) 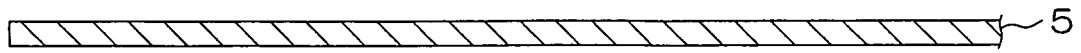
(b) 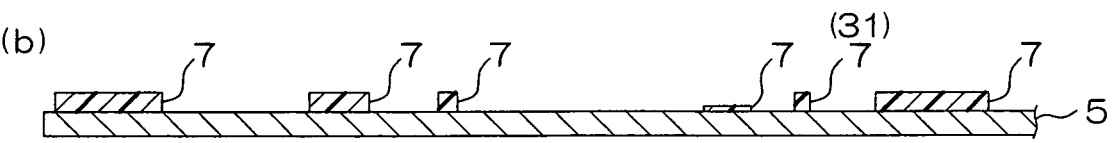
(c) 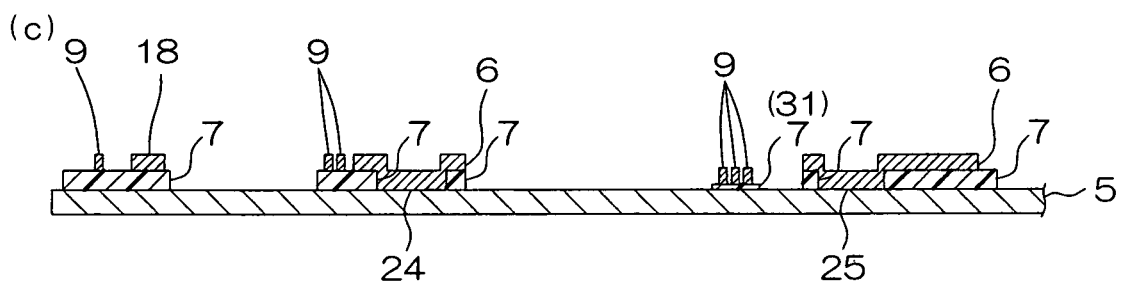
(d) 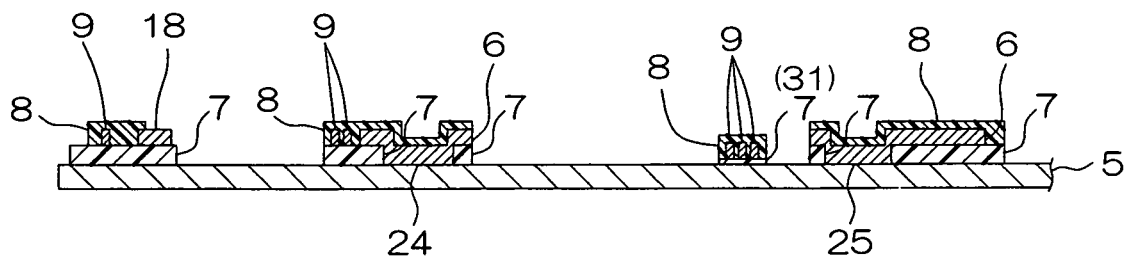
(e) 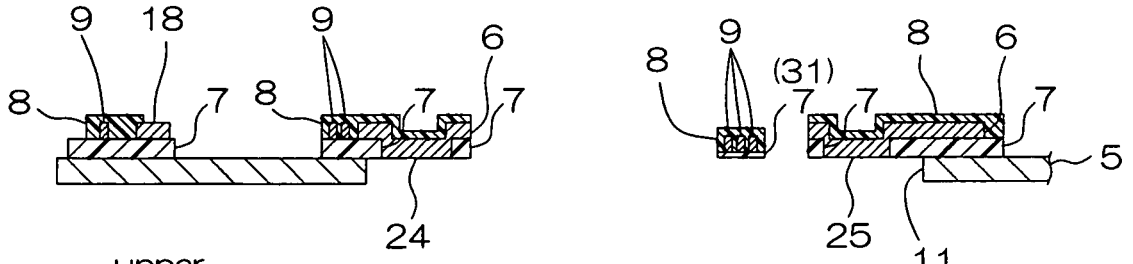
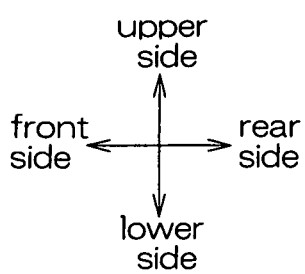

FIG.20
(f)
(g)
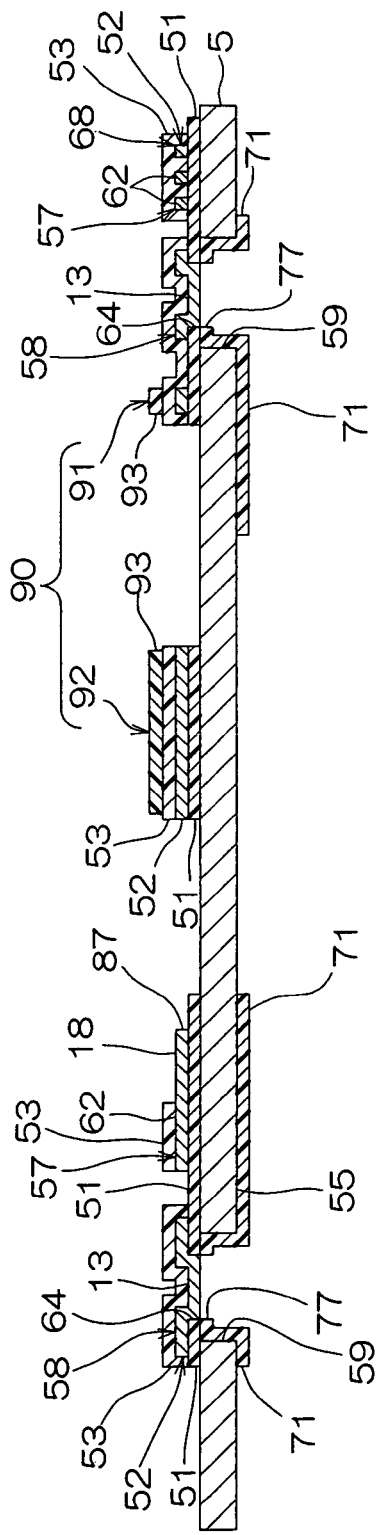
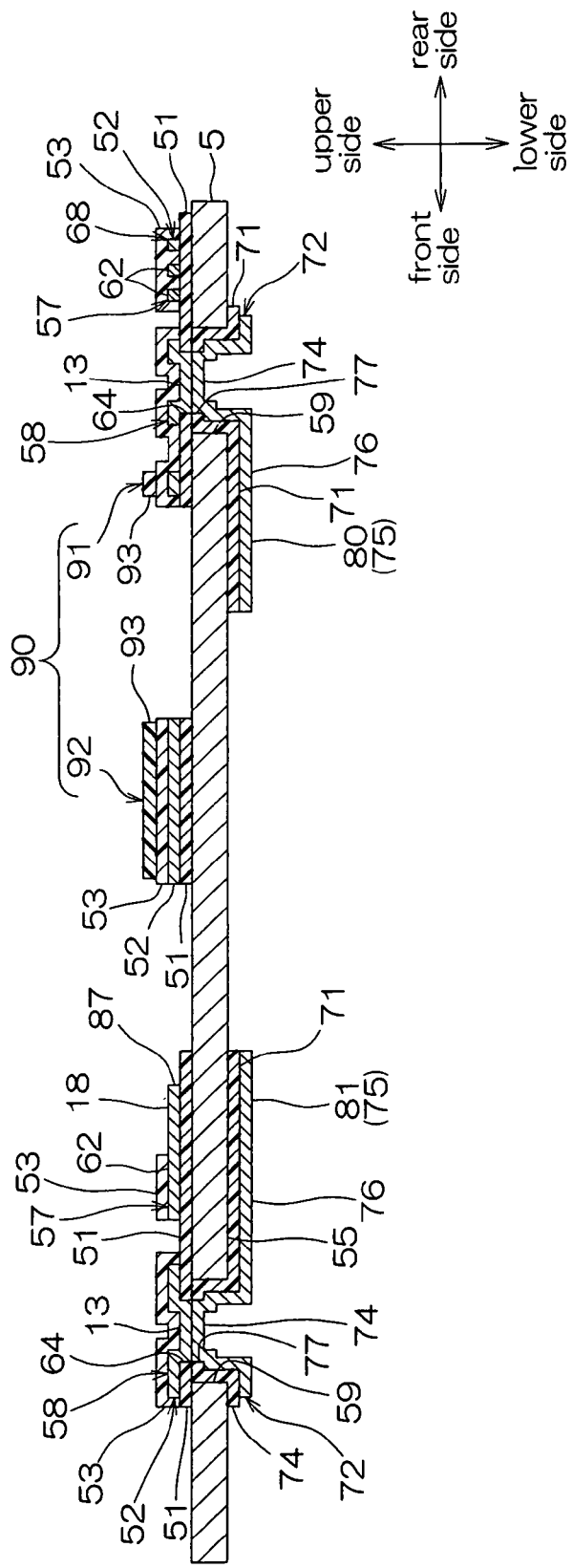

FIG.21 (h)
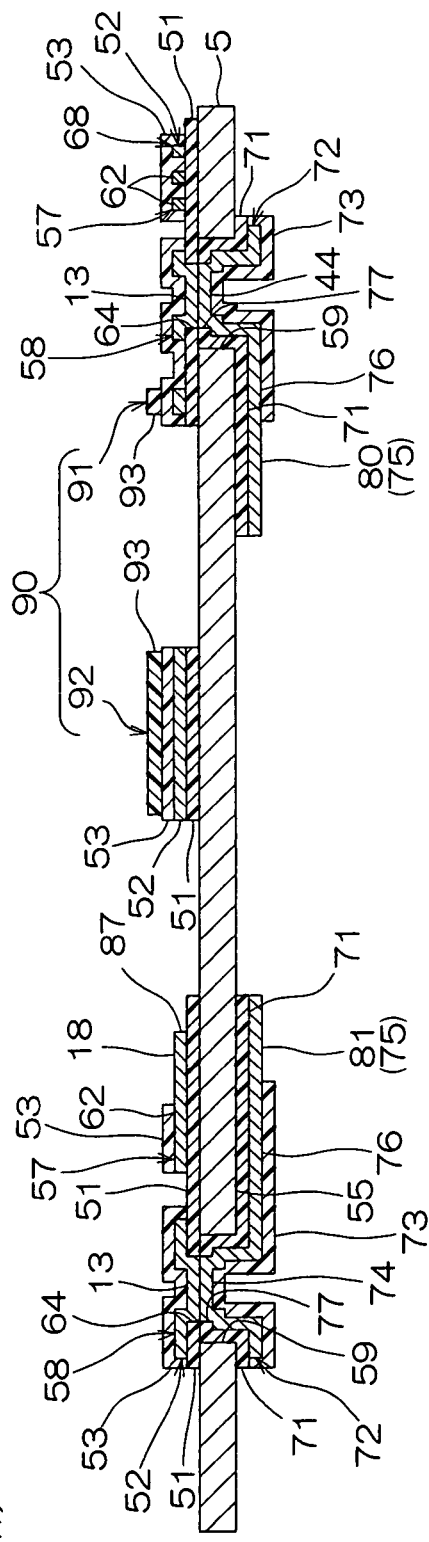
(i)
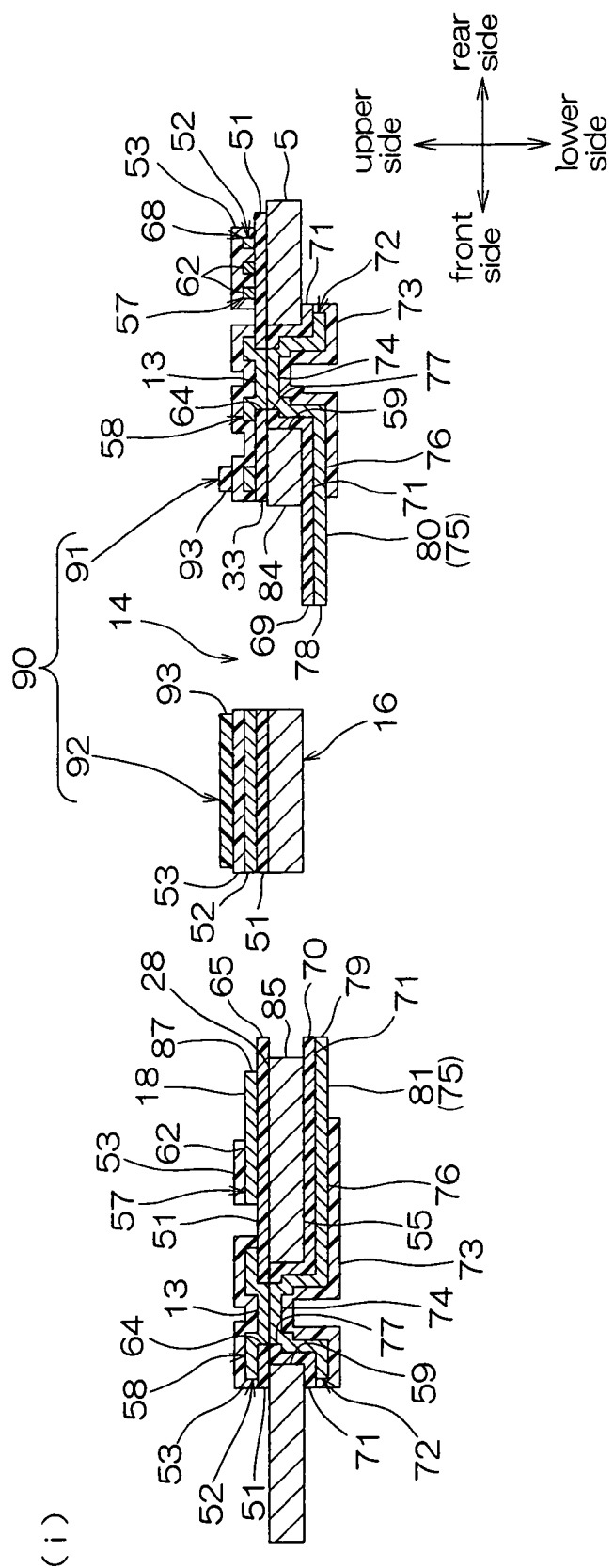

SUSPENSION BOARD WITH CIRCUIT

CROSS-REFERENCE TO RELATED APPLICATION

The present application claims the benefit of U.S. Provisional Application No. 61/344,833 filed on Oct. 20, 2010, and claims priority from Japanese Patent Applications No. 2010-227592 filed on Oct. 7, 2010 and No. 2011-155499 filed on Jul. 14, 2011, the contents of which are hereby incorporated by reference into this application.

BACKGROUND OF THE INVENTION

1. Field of the Invention

The present invention relates to a suspension board with circuit, to be specific, to a suspension board with circuit that is used in a hard disk drive.

2. Description of Related Art

Conventionally, it has been known that a microactuator is provided in a suspension board with circuit on which a magnetic head is mounted so as to adjust the position and the angle of the magnetic head finely.

There has been proposed, for example, a head gimbal assembly including a tongue portion that has a stage and in which a trace is formed, a head slider that is fixed to the stage, and a piezoelectric element that is provided in the tongue portion and supports the stage so that the stage is capable of rotating (ref: for example, Japanese Unexamined Patent Publication No. 2010-146631).

In the head gimbal assembly in Japanese Unexamined Patent Publication No. 2010-146631, the stage and the head slider are rotated by the stretching and shrinking movement of the piezoelectric element. The trace is wired around so as to detour around the end portion of the head slider at the time of the rotation.

SUMMARY OF THE INVENTION

However, when the trace is disposed so as to detour around the head slider, it is difficult to achieve miniaturization of the suspension board with circuit and high density arrangement of the trace.

On the other hand, when the trace is disposed so as to be overlapped with the head slider in the thickness direction, there is a disadvantage that the end portion of the head slider frictionally slides against the trace at the time of the rotation of the head slider, so that the trace is damaged.

It is an object of the present invention to provide a suspension board with circuit that is capable of mounting a slider so that the slider is capable of relatively moving with respect to a conductive region, adjusting the position and the angle of a magnetic head finely, achieving miniaturization and high density arrangement of a conductive layer, and preventing damage to the conductive layer.

A suspension board with circuit of the present invention includes a conductive region in which a conductive layer is formed and a mounting region for mounting a slider on which a magnetic head that is electrically connected to the conductive layer is mounted, wherein the mounting region mounts the slider so that the slider is capable of relatively moving with respect to the conductive region, and the conductive region includes an opposing region that is opposed to the slider in the thickness direction at the time of the relative movement of the slider with respect to the conductive region and a damage preventing portion for preventing damage to the opposing region by the slider.

According to the suspension board with circuit, the mounting region mounts the slider so that the slider is capable of relatively moving with respect to the conductive region and the position and the angle of the magnetic head can be adjusted finely.

The conductive region includes the opposing region, so that miniaturization of the suspension board with circuit and high density arrangement of the conductive layer can be achieved.

In addition, the suspension board with circuit includes the damage preventing portion, so that damage to the opposing region by the slider can be prevented.

Furthermore, in the suspension board with circuit of the present invention, it is preferable that the damage preventing portion is a separating portion that separates the slider that relatively moves with respect to the conductive region from the opposing region in the thickness direction.

In the suspension board with circuit, the slider and the opposing region are separated from each other in the thickness direction by the separating portion, so that damage to the opposing region by the slider can be prevented reliably.

In the suspension board with circuit of the present invention, it is preferable that the separating portion is a thin-walled region whose thickness is thinner than that of the conductive region other than the opposing region.

In the suspension board with circuit, the thickness of the thin-walled region is thinner than that of the conductive region other than the opposing region, so that the spacing to the slider in the thickness direction can be sufficiently ensured at the time of the relative movement of the slider. Therefore, damage to the opposing region by the slider can be prevented further more reliably.

In the suspension board with circuit of the present invention, it is preferable that the mounting region mounts the slider so that one end of the slider is fixed and the other end thereof is capable of relatively moving with respect to the conductive region and the thin-walled region is, when projected in the thickness direction, opposed to the other end of the slider at the time of the relative movement with respect to the conductive region.

In the suspension board with circuit, it is preferable that the conductive region includes an insulating base layer, the conductive layer that is formed on the insulating base layer, and an insulating cover layer that is formed on the insulating base layer so as to cover the conductive layer; and the thickness of at least one-layer that is selected from a group consisting of the insulating base layer, the conductive layer, and the insulating cover layer in the thin-walled region is thinner than that of at least the one-layer in the conductive region other than the opposing region.

In the suspension board with circuit, it is preferable that the separating portion is a pedestal for supporting the slider so that the slider is capable of relatively moving.

According to the suspension board with circuit, the pedestal supports the slider so that the slider is capable of relatively moving, so that the spacing to the slider in the thickness direction can be ensured at the time of the relative movement of the slider. Therefore, damage to the opposing region by the slider can be prevented further more reliably.

In the suspension board with circuit of the present invention, it is preferable that the pedestal is in contact with the slider so that the slider is capable of frictionally sliding during before and after the relative movement of the slider.

In the suspension board with circuit, the pedestal is in contact with the slider so that the slider is capable of frictionally sliding during before and after the relative movement of the slider, so that a smooth relative movement of the slider is secured and therefore, the spacing between the opposing region and the slider in the thickness direction can be ensured reliably.

In the suspension board with circuit of the present invention, it is preferable that the pedestal is formed so as to extend along the moving direction of the slider.

In the suspension board with circuit, the pedestal is formed so as to extend along the moving direction of the slider, so that the moving slider is supported reliably and therefore, the spacing between the opposing region and the slider in the thickness direction can be ensured reliably.

BRIEF DESCRIPTION OF THE DRAWINGS

FIG. 7 shows process drawings for describing a method for producing the suspension board with circuit:
(a) illustrating a step of preparing a metal supporting board,
(b) illustrating a step of preparing an insulating base layer,
(c) illustrating a step of forming a conductive layer,
(d) illustrating a step of preparing an insulating cover layer, and
(e) illustrating a step of forming a board opening.

FIG. 20 shows process drawings for describing a method for producing the suspension board with circuit, subsequent to FIG. 19:
(f) illustrating a step of forming the second insulating base layer and
(g) illustrating a step of forming a second conductive pattern.

FIG. 21 shows process drawings for describing a method for producing the suspension board with circuit, subsequent to FIG. 20:
(h) illustrating a step of forming a second insulating cover layer and
(i) illustrating a step of forming the board opening and a communicating space.

DETAILED DESCRIPTION OF THE INVENTION

Figure 1:
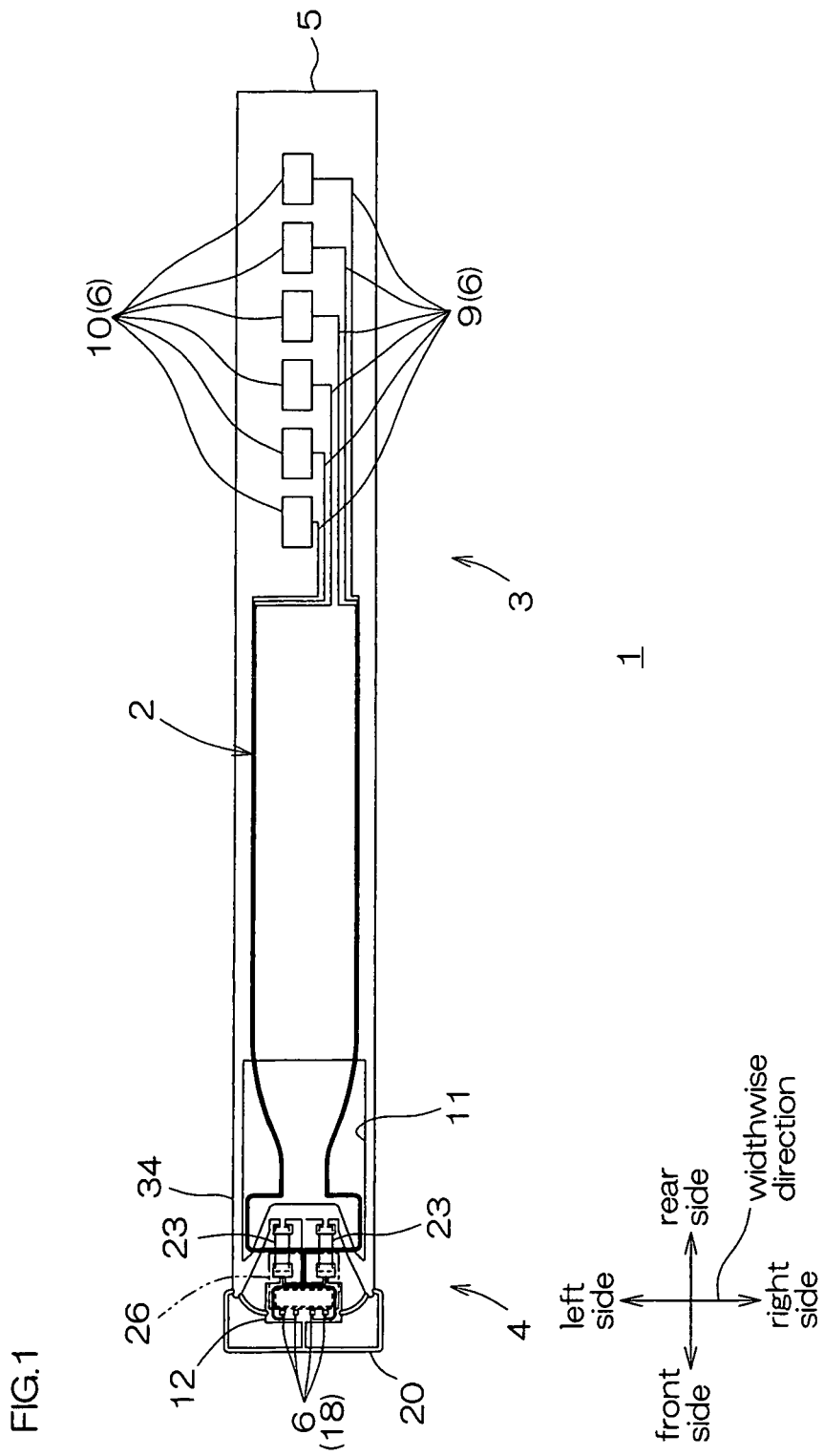
FIG. 1 shows a plan view of one embodiment (embodiment in which a thin-walled region is provided) of a suspension board with circuit of the present invention.
Figure 2:
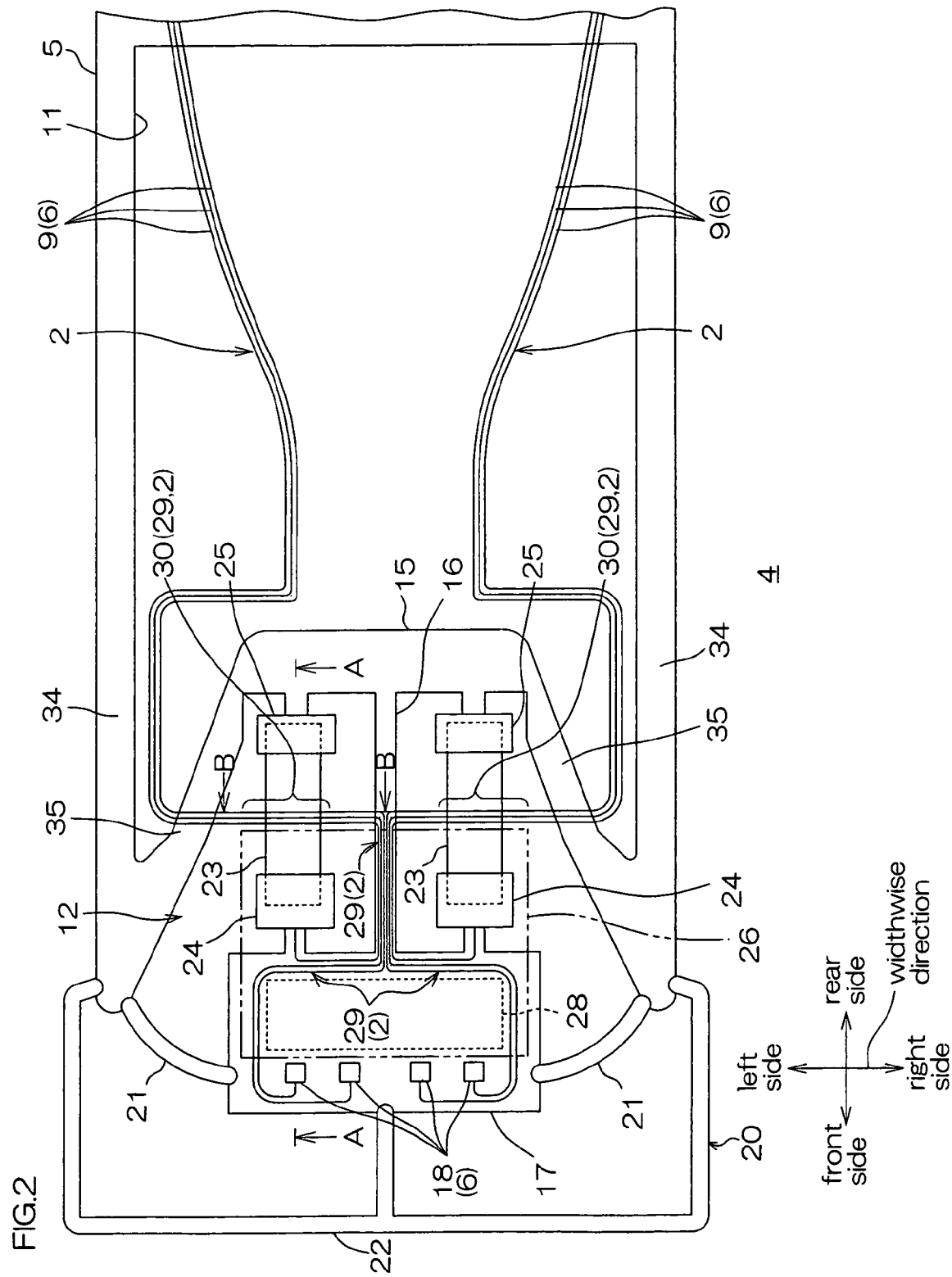
FIG. 2 shows an enlarged plan view of a gimbal portion of the suspension board with circuit shown in FIG. 1.
Figure 3:
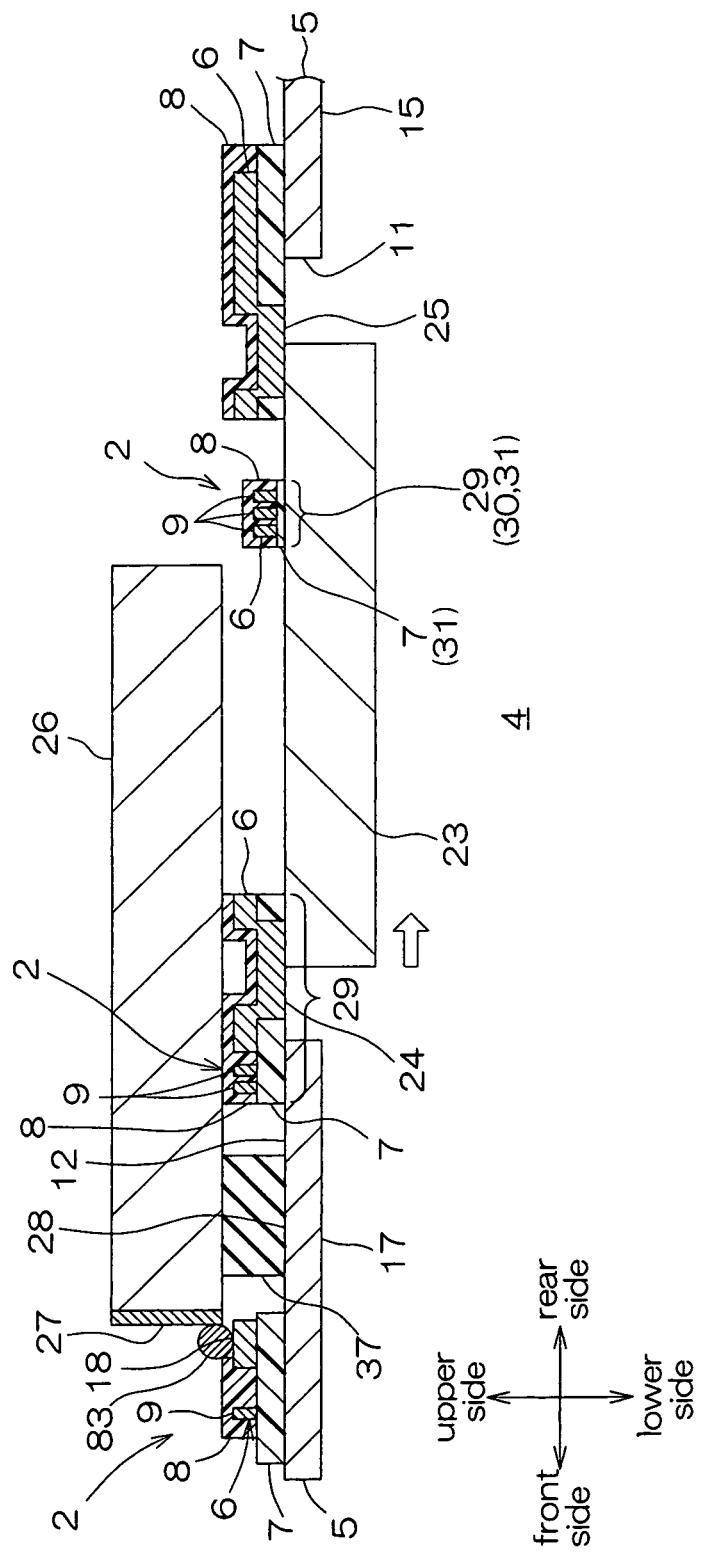
FIG. 3 shows a sectional view, taken along the line A-A of the gimbal portion shown in FIG. 2.
Figure 4:
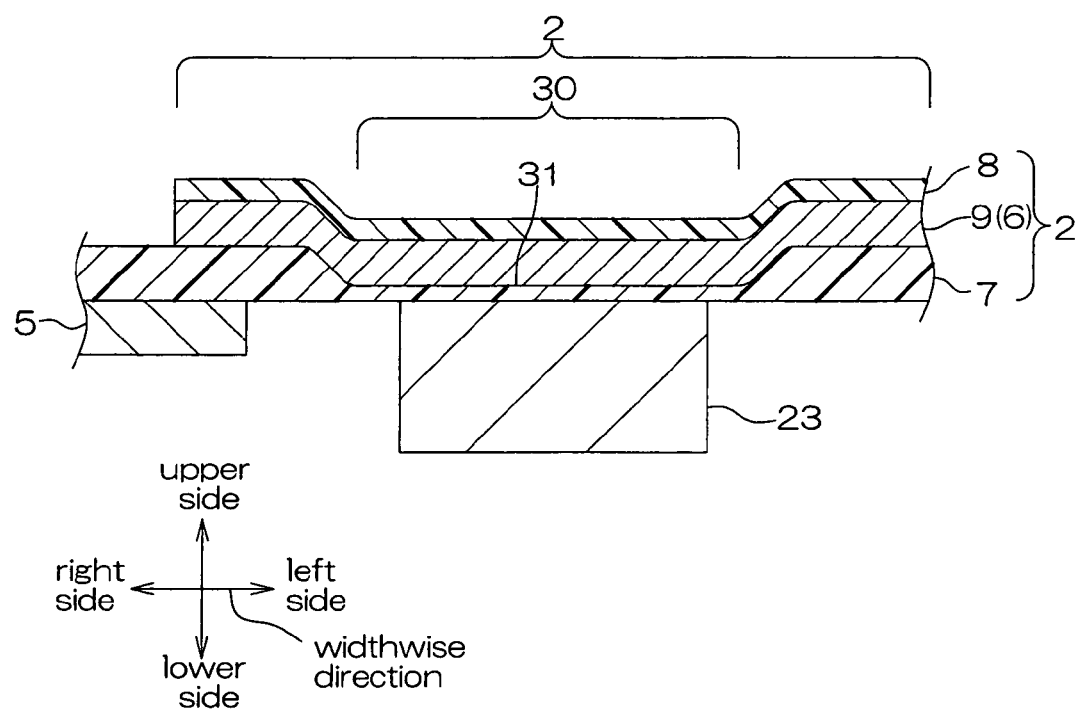
FIG. 4 shows a sectional view, taken along the line B-B of the gimbal portion shown in FIG. 2.
Figure 5:
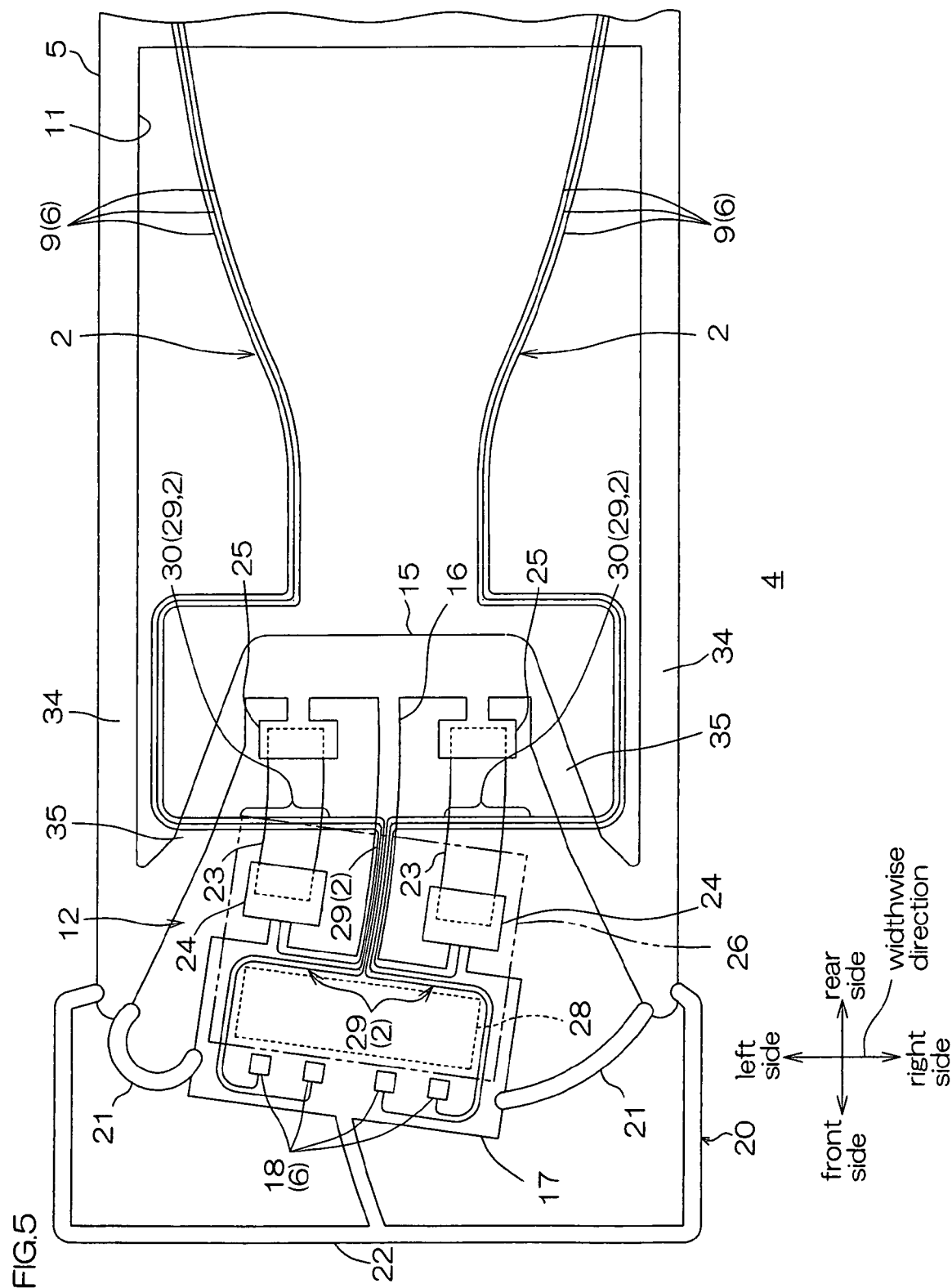
FIG. 5 shows a plan view illustrating a state where a stage of the gimbal portion is swung shown in FIG. 2.
Figure 6:
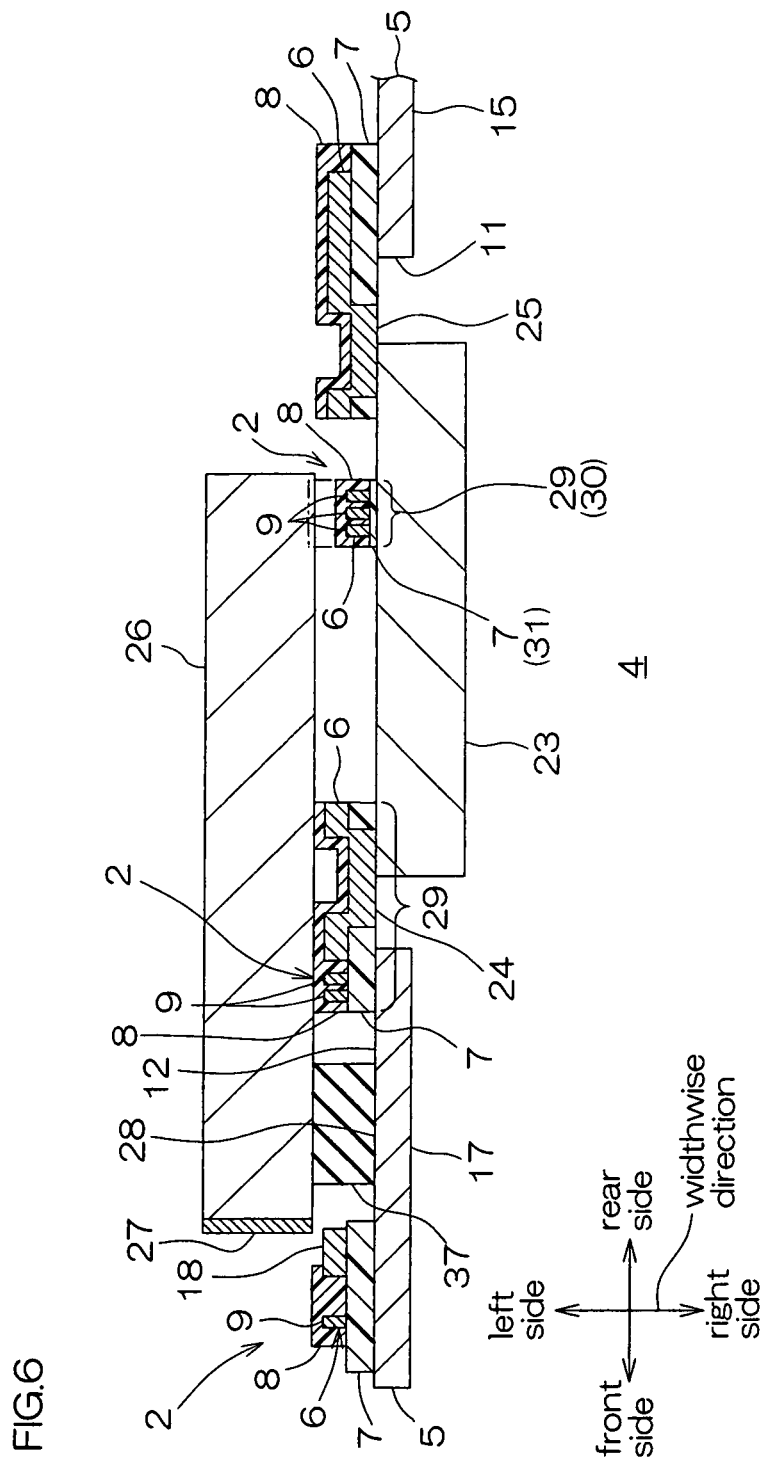
FIG. 6 shows a sectional view illustrating a state where the stage of the gimbal portion is swung shown in FIG. 2.

FIG. 1 shows a plan view of one embodiment (embodiment in which a thin-walled region is provided) of a suspension board with circuit of the present invention. FIG. 2 shows an enlarged plan view of a gimbal portion of the suspension board with circuit shown in FIG. 1. FIGS. 3 and 4 show sectional views, each taken along the line A-A and the line B-B of the gimbal portion shown in FIG. 2. FIGS. 5 and 6 each show a plan view and a sectional view illustrating a state where a stage of the gimbal portion is swung shown in FIG. 2. FIG. 7 shows process drawings for describing a method for producing the suspension board with circuit.

In FIGS. 1, 2, and 5, an insulating base layer 7 and an insulating cover layer 8 to be described later are omitted so as to clearly show the relative arrangement of a conductive layer 6 and a slider 26 to be described later.

In FIGS. 1 and 2, a suspension board with circuit 1 is mounted with the slider 26 (phantom lines in FIG. 2 and solid lines in FIG. 3) mounted with a magnetic head 27 (FIG. 3) and a piezoelectric element 23, and the suspension board with circuit 1 is mounted on a hard disk drive (not shown).

In the suspension board with circuit 1, the conductive layer 6 is supported by a metal supporting board 5.

The metal supporting board 5 is formed into a generally rectangular flat belt shape in plane view extending in the lengthwise direction and integrally includes a main body portion 3 and a gimbal portion 4 that is formed on the front side (one side in the lengthwise direction, hereinafter the same) of the main body portion 3.

The main body portion 3 is formed into a generally rectangular shape in plane view.

The gimbal portion 4 is formed so as to extend from the front end of the main body portion 3 toward the front side. A board opening 11 that is formed into a generally rectangular shape in plane view penetrating in the thickness direction is formed in the gimbal portion 4.

The gimbal portion 4 includes an outrigger portion 34 that is defined as the outer sides of the board opening 11 in the widthwise direction (the direction perpendicular to the front-rear direction) and a tongue portion 12 that is connected to the outrigger portion 34.

The outrigger portion 34 is formed so as to extend linearly from the both widthwise end portions of the main body portion 3 toward the front side.

As shown in FIG. 2, the tongue portion 12 is provided on the widthwise inner side of the outrigger portion 34 and is connected to the outrigger portion 34 via a first connecting portion 35 that extends from the front end portion of the outrigger portion 34 obliquely toward the rear side in the widthwise inner side. The tongue portion 12 is formed into a generally H-shape in plane view. The tongue portion 12 integrally includes a basal portion 15 that is formed into a generally rectangular shape in plane view extending long in the widthwise direction, a stage 17 that is disposed at the front side of the basal portion 15 in spaced relation thereto and is formed into a generally rectangular shape in plane view extending long in the widthwise direction, and a central portion 16 that connects the widthwise center of the basal portion 15 to that of the stage 17 and is formed into a generally rectangular shape in plane view that is long in the front-rear direction.

The center in the widthwise direction and the center in the front-rear direction of the stage 17 are defined as a mounting region 28 on which the slider 26 is mounted. The stage 17 is connected to the outrigger portion 34 with a second connecting portion 20.

The second connecting portion 20 includes a curved portion 21 that connects the front end of each of the outrigger portions 34 to the both widthwise ends of the stage 17 in a curved state and an E-shaped portion 22 that connects the front end of each of the outrigger portions 34 to the front end of the stage 17.

The curved portions 21 extend from the front ends of the outrigger portions 34 obliquely toward the front side in the widthwise inner side in a curved state to reach the both widthwise ends of the stage 17.

The E-shaped portion 22 is formed into a generally E-shape in plane view and to be specific, extends from the front ends of the both outrigger portions 34 toward the front side and then bends toward the widthwise inner side. After extending toward the widthwise inner side to be united, the E-shaped portion 22 bends toward the rear side to reach the front end of the stage 17.

The central portion 16 is formed so as to be capable of being curved in the widthwise direction with the width narrow.

As shown in FIG. 1, the conductive layer 6 includes an external terminal 10, a head-side terminal 18, a front-side piezoelectric terminal 24 (FIG. 2), a rear-side piezoelectric terminal 25 (FIG. 2), and a wire 9.

A plurality (six pieces) of the external terminals 10 are provided on the rear end portion of the main body portion 3 and are arranged at spaced intervals to each other in the front-rear direction.

As shown in FIG. 2, a plurality (four pieces) of the head-side terminals 18 are provided on the front end portion of the stage 17 and are arranged at spaced intervals to each other in the widthwise direction.

The front-side piezoelectric terminal 24 is formed so as to protrude from the rear end edge of the widthwise outer side portion of the stage 17 toward the rear side and a plurality (two pieces) thereof are arranged at spaced intervals to each other in the both widthwise outer sides of the central portion 16.

To be specific, the front-side piezoelectric terminal 24 is formed so that the wire 9 (described later) of the rear end portion of the stage 17 protrudes from the rear end edge of the stage 17 toward the rear side and expands in the widthwise direction. In addition, though described later, as referred in FIG. 3, in the circumference end portion of the conductive layer 6 that forms the front-side piezoelectric terminal 24, the insulating base layer 7 that is formed below the wire 9 in the rear end portion of the stage 17 is continuously formed into a generally frame shape in plane view and the conductive layer 6 is sunk into the frame of the insulating base layer 7.

As shown in FIG. 2, the rear-side piezoelectric terminal 25 is formed corresponding to the front-side piezoelectric terminal 24 and is formed at the rear side of each of the front-side piezoelectric terminals 24 at spaced intervals thereto. The rear-side piezoelectric terminal 25 is formed so as to protrude from the front end edge of the widthwise outer side portion of the basal portion 15 toward the front side and a plurality (two pieces) thereof are arranged at spaced intervals to each other in the widthwise direction.

To be specific, the rear-side piezoelectric terminal 25 is formed so that the conductive layer 6 protrudes from the front end edge of the basal portion 15 toward the front side and expands in the widthwise direction. In addition, though described later, as referred in FIG. 3, in the circumference end portion of the conductive layer 6 that forms the rear-side piezoelectric terminal 25, the insulating base layer 7 is formed into a generally frame shape in plane view and the conductive layer 6 is sunk into the frame of the insulating base layer 7. The rear-side piezoelectric terminal 25 is provided independently from the wire 9 and is connected to ground via a ground wire that is not shown.

As shown in FIGS. 1 and 2, the wire 9 is continuous to the external terminal 10, the head-side terminal 18, and the front-side piezoelectric terminal 24 and electrically connects them to each other.

As shown in FIG. 1, in the main body portion 3, a plurality (six pieces) of the wires 9 are formed at spaced intervals to each other in the widthwise direction.

To be specific, the wires 9 are arranged in the following manner. In the rear end portion of the main body portion 3, the wires 9 extend from the external terminals 10 toward the front side and in the middle of the front-rear direction of the main body portion 3, bend toward the both widthwise sides in two bunches in a branched state. Thereafter, the wires 9 bend toward the front side in the both widthwise end portions and extend toward the front end portion of the main body portion 3 along the widthwise outer end edges. As shown in FIG. 2, in the gimbal portion 4, the wires 9 pass through the board opening 11 and the first connecting portion 35 and subsequently, pass through between the front-side piezoelectric terminal 24 and the rear-side piezoelectric terminal 25 to reach the middle of the front-rear direction of the central portion 16 in a focused state. Then, the wires 9 bend toward the front side, subsequently extend along the central portion 16 toward the front side, and then in the rear end portion of the stage 17, curve toward the both widthwise sides in two bunches in a branched state. Thereafter, the wires 9 extend along the circumference end edges of the stage 17 and then turn to finally reach the head-side terminals 18 and the front-side piezoelectric terminals 24.

In the wire 9, the portion that is disposed between the first connecting portion 35 and the central portion 16 (corresponding to the wire 9 that forms a thin-walled region 30 to be described later) is formed linearly along the widthwise direction.

As shown in FIG. 3, in sectional view, the insulating base layer 7 and the insulating cover layer 8 are formed around the wire 9, and the wire 9 forms a conductive region 2 together with the insulating base layer 7 and the insulating cover layer 8.

The suspension board with circuit 1 includes the metal supporting board 5, the insulating base layer 7 that is formed on the metal supporting board 5, the conductive layer 6 that is formed on the insulating base layer 7, and the insulating cover layer 8 that is formed on the insulating base layer 7 so as to cover the conductive layer 6.

As shown in FIG. 1, the metal supporting board 5 is formed into a shape corresponding to the outer shape of the suspension board with circuit 1. The metal supporting board 5 is formed from a metal material such as stainless steel, 42-alloy, aluminum, copper-beryllium, or phosphor bronze. Preferably, the metal supporting board 5 is formed from stainless steel. The metal supporting board 5 has a thickness in the range of, for example, 15 to 50 μm, or preferably 20 to 30 μm.

As referred in FIGS. 1 and 2, the insulating base layer 7 is formed over the main body portion 3 and the gimbal portion 4. As shown in FIG. 3, the insulating base layer 7 is formed corresponding to the portion where the conductive layer 6 is formed. The insulating base layer 7 forms the conductive region 2 together with the conductive layer 6.

To be specific, the insulating base layer 7 is, in the gimbal portion 4, formed along the wires 9 in the board opening 11 and on the first connecting portion 35 and the central portion 16 while in the main body portion 3, formed on the metal supporting board 5.

Furthermore, the insulating base layer 7 is formed so as to protrude from the metal supporting board 5 of the stage 17 toward the rear side and is formed into a generally rectangular frame shape in plane view in the circumference end portion of the front-side piezoelectric terminal 24. Also, the insulating base layer 7 is formed so as to protrude from the metal supporting board 5 of the basal portion 15 toward the front side and is formed into a generally rectangular frame shape in plane view in the circumference end portion of the rear-side piezoelectric terminal 25.

As shown in FIG. 2, the insulating base layer 7 is also formed as a pattern for forming the second connecting portion 20.

The insulating base layer 7 is formed from an insulating material such as a synthetic resin including polyimide resin, polyamide imide resin, acrylic resin, polyether nitrile resin, polyether sulfone resin, polyethylene terephthalate resin, polyethylene naphthalate resin, and polyvinyl chloride resin. Preferably, the insulating base layer 7 is formed from polyimide resin.

The insulating base layer 7 has a thickness in the range of, for example, 1 to 35 μm, or preferably 3 to 33 μm.

As described above, the conductive layer 6 is formed as a pattern including the external terminal 10 (FIG. 1), the head-side terminal 18, the front-side piezoelectric terminal 24, the rear-side piezoelectric terminal 25, and the wire 9.

As shown in FIG. 3, the front-side piezoelectric terminal 24 and the rear-side piezoelectric terminal 25 are formed so as to be sunk into the inside of the insulating base layer 7 that is formed into a generally frame shape in plane view. In this way, the lower surfaces of the front-side piezoelectric terminal 24 and the rear-side piezoelectric terminal 25 are exposed from the insulating base layer 7 toward the lower side.

The lower surface of the front-side piezoelectric terminal 24 is formed so as to be flush with the lower surface of the insulating base layer 7 that is formed in the circumference end portion thereof in the widthwise direction and the front-rear direction. The lower surface of the rear-side piezoelectric terminal 25 is formed so as to be flush with the lower surface of the insulating base layer 7 that is formed in the circumference end portion thereof in the widthwise direction and the front-rear direction.

The conductive layer 6 is formed from a conductive material such as copper, nickel, gold, solder, or alloys thereof. The conductive layer 6 has a thickness in the range of, for example, 3 to 50 μm, or preferably 5 to 20 μm.

The wire 9 has a width in the range of, for example, 5 to 200 μm, or preferably 8 to 100 μm. The external terminal 10, the head-side terminal 18, the front-side piezoelectric terminal 24, and the rear-side piezoelectric terminal 25 each have a width and a length (length in the lengthwise direction) in the range of, for example, 20 to 1000 μm, or preferably 30 to 800 μm.

As referred in FIG. 1, the insulating cover layer 8 is formed over the main body portion 3 and the gimbal portion 4 and as shown in FIG. 3, is formed into a pattern including the conductive layer 6 in plane view. The insulating cover layer 8 forms the conductive region 2 together with the conductive layer 6 and the insulating base layer 7.

To be specific, the insulating cover layer 8 is formed into a pattern in which the insulating cover layer 8 covers the upper surfaces of the wire 9, the front-side piezoelectric terminal 24, and the rear-side piezoelectric terminal 25 and exposes the upper surfaces of the external terminal 10 (ref: FIG. 1) and the head-side terminal 18.

The insulating cover layer 8 is formed from the same insulating material as that for forming the insulating base layer 7. The insulating cover layer 8 has a thickness in the range of, for example, 1 to 40 μm, or preferably 3 to 10 μm.

The slider 26 and the piezoelectric element 23 are mounted on the suspension board with circuit 1.

As shown in phantom lines in FIG. 2, and in FIG. 3, the slider 26 is formed into a generally rectangular box shape in plane view and the front end portion of the slider 26 is adhered to the mounting region 28 of the stage 17 via an adhesive layer 37 made of a known adhesive.

The thickness of the adhesive layer 37 is substantially the same as, for example, the total thickness of the insulating base layer 7, the conductive layer 6, and the insulating cover layer 8.

In this way, the front end portion of the slider 26 is fixed to the mounting region 28.

As shown in FIG. 2, the front end edge of the slider 26 is formed along the head-side terminal 18 and to be specific, is formed at the rear side of the head-side terminal 18 at minute spaced intervals thereto. In this way, as shown in FIG. 3, the magnetic head 27 that is mounted on the front end portion of the slider 26 is electrically connected to the head-side terminal 18 via a solder ball 83 and the like.

As shown in FIG. 2, the rear end edge of the slider 26 is disposed so as to pass over between the front-side piezoelectric terminal 24 and the rear-side piezoelectric terminal 25, and over the middle of the front-rear direction of the central portion 16 in the widthwise direction. To be specific, the rear end edge of the slider 26 is disposed so as to be along the conductive region 2 (the thin-walled region 30 to be described later) that is disposed between the first connecting portion 35 and the central portion 16 linearly and along the widthwise direction. When projected in the thickness direction, the rear end edge of the slider 26 is disposed in parallel to the front side of the conductive region 2 at minute spaced intervals thereto.

The slider 26 is, in plane view, mounted so as to include the conductive region 2 along the central portion 16 and the conductive region 2 in the rear end portion of the stage 17.

The piezoelectric element 23 is mounted so as to be disposed between each of the front-side piezoelectric terminals 24 and each of the rear-side piezoelectric terminals 25 so that the piezoelectric element 23 is capable of stretching and shrinking in the front-rear direction. To be specific, the front end portion and the rear end portion of each of the piezoelectric elements 23 are electrically connected to the front-side piezoelectric terminal 24 and the rear-side piezoelectric terminal 25 and are fixed thereto, respectively.

Electric power is supplied to the piezoelectric element 23 via the front-side piezoelectric terminal 24, so that the piezoelectric element 23 stretches and shrinks by controlling the electric voltage.

Although, in FIGS. 3 and 4, it is shown that the conductive region 2 that is disposed between the first connecting portion 35 and the central portion 16 is placed on the upper surface of the piezoelectric element 23, in reality, a minute spacing is provided therebetween.

Next, the swinging of the slider 26 by the stretching and shrinking of the piezoelectric element 23 is described with reference to FIGS. 2, 3, 5, and 6.

First, electric power is supplied to the piezoelectric element 23 via the front-side piezoelectric terminal 24 and the electric voltage of the electric power is controlled, so that one of the piezoelectric elements 23 shrinks. Then, the front-side piezoelectric terminal 24 and the rear-side piezoelectric terminal 25 that fix one of the piezoelectric elements 23 relatively come into close contact with each other. That is, one of the front-side piezoelectric terminals 24 moves toward the rear side with respect to one of the rear-side piezoelectric terminals 25 supported by the basal portion 15.

At the same time with this, electric power is supplied via the front-side piezoelectric terminal 24 and the electric voltage of the electric power is controlled, so that the other piezoelectric element 23 stretches. Then, the front-side piezoelectric terminal 24 and the rear-side piezoelectric terminal 25 that fix the other piezoelectric element 23 are relatively separated from each other. That is, the other front-side piezoelectric terminal 24 moves toward the front side with respect to the other rear-side piezoelectric terminal 25 supported by the basal portion 15.

In this way, the front end and the middle of the front-rear direction of the central portion 16 curve toward one side in the widthwise direction (the left side in FIG. 5) and the stage 17 swings toward one side in the widthwise direction with respect to the rear end of the central portion 16 as a supporting point. With this, the slider 26 swings toward one side in the widthwise direction.

Then, as shown in FIGS. 5 and 6, the widthwise one end portion of the rear end portion of the slider 26 is opposed to the conductive region 2 that is disposed between the first connecting portion 35 and the central portion 16 in the thickness direction. On the other hand, the widthwise other end portion of the rear end portion of the slider 26 is separated from the above-described conductive region 2.

When one of the piezoelectric elements 23 stretches and the other thereof shrinks, the slider 26 swings toward the opposite direction (the widthwise other side, the right side in FIG. 5) to the description above.

In the suspension board with circuit 1, in FIG. 5, the portion that is opposed to the slider 26 in the thickness direction in the conductive region 2 at the time of the swinging of the slider 26 described above is defined as an opposing region 29.

The opposing region 29 includes the conductive region 2 (the thin-walled region 30 to be described later) that is disposed between the first connecting portion 35 and the central portion 16, the conductive region 2 along the central portion 16, and the conductive region 2 in the rear end portion of the stage 17.

In the suspension board with circuit 1, the conductive region 2 that is disposed between the first connecting portion 35 and the central portion 16 is defined as the thin-walled region 30.

As shown in FIGS. 3 and 4, the thickness of the thin-walled region 30 is formed thinner than that of the conductive region 2 other than the opposing region 29. The thin-walled region 30 has a thickness that is thinner by, for example, 2 to 45 µm, or preferably 5 to 40 µm than that of the conductive region 2 other than the opposing region 29.

To be specific, the thin-walled region 30 has a thickness in the range of, for example, 5 to 48 µm, or preferably 8 to 45 µm.

The conductive region 2 other than the opposing region 29 has a thickness in the range of, for example, 10 to 50 µm, or preferably 13 to 35 µm.

To be specific, the thickness of the insulating base layer 7 in the thin-walled region 30 is thinner than that of the insulating base layer 7 in the conductive region 2 other than the opposing region 29. To be specific, the thickness of the insulating base layer 7 in the thin-walled region 30 is formed thinner by, for example, 2 to 30 µm, or preferably 5 to 30 µm. The insulating base layer 7 in the thin-walled region 30, that is, a thin-walled base portion 31, has a thickness in the range of, for example, 1 to 33 µm, or preferably 3 to 30 µm.

To obtain the suspension board with circuit 1, as shown in FIG. 7 (a), the metal supporting board 5 is first prepared.

Next, as shown in FIG. 7 (b), the insulating base layer 7 is formed on the metal supporting board 5. To form the insulating base layer 7, a varnish of the photosensitive insulating material is applied onto the metal supporting board 5 and is then dried to form a base film.

Thereafter, the base film is exposed to light via a gradation exposure photomask that is not shown (gradation exposure). The gradation exposure photomask includes a light shielding portion, a light semi-transmitting portion, and a light full transmitting portion in a pattern. The light full transmitting portion to the portion where the insulating base layer 7 (except for the portion where the thin-walled base portion 31 is formed) is formed, the light semi-transmitting portion to the portion where the thin-walled base portion 31 is formed, and the light shielding portion to the portion where the insulating base layer 7 is not formed, are respectively disposed in opposed relation to the base film.

Then, the base film is developed to be cured as required, so that the insulating base layer 7 including the thin-walled base portion 31 is formed with the above-described pattern.

Next, as shown in FIG. 7 (c), the conductive layer 6 is formed on the metal supporting board 5 and the insulating base layer 7 by a pattern forming method such as an additive method or a subtractive method.

Subsequently, as shown in FIG. 7 (d), the insulating cover layer 8 is formed on the insulating base layer 7. To form the insulating cover layer 8, a varnish of the photosensitive insulating material is applied and is then dried to form a cover film. Thereafter, the cover film is exposed to light and is then developed to be heat cured, so that the insulating cover layer 8 is formed with the above-described pattern.

Then, as shown in FIG. 7 (e), the metal supporting board 5 is cut out by, for example, etching and the like to form the board opening 11.

According to the above-described suspension board with circuit 1, the mounting region 28 mounts the slider 26 so that the slider 26 is capable of relatively moving with respect to the conductive region 2, so that the position and the angle of the magnetic head 27 can be adjusted finely.

The conductive region 2 includes the opposing region 29, so that miniaturization of the suspension board with circuit 1 and high density arrangement of the conductive layer 6 can be achieved.

Furthermore, the thickness of the thin-walled region 30 is thinner than that of the conductive region 2 other than the opposing region 29, so that the spacing to the slider 26 in the thickness direction can be sufficiently ensured at the time of the swinging.

To be specific, the thickness of the thin-walled base portion 31 is thinner than that of the insulating base layer 7 in the conductive region 2 other than the opposing region 29, so that the up-down position of the upper surface of the conductive layer 6 in the thin-walled region 30 is lower than that of the upper surface of the conductive layer 6 in the conductive region 2 other than the opposing region 29.

Therefore, as shown in FIG. 6, when projected in the thickness direction, even though overlapped with the slider 26, the thin-walled region 30 can serve as a separating portion that is separated from the slider 26 in the thickness direction.

Therefore, the slider 26 and the opposing region 29 are separated from each other in the thickness direction by the thin-walled region 30, so that damage to the opposing region 29 by the slider 26 can be prevented reliably.

In this way, it is possible to effectively prevent that the conductive layer 6 in the thin-walled region 30 and the lower surface of the slider 26 are in contact with each other.

That is, the thin-walled region 30 can serve as a damage preventing portion for preventing damage to the conductive layer 6 in the opposing region 29 by the slider 26.

On the other hand, as shown in phantom lines in FIG. 6, when the thickness of the thin-walled region 30 is formed thick, the thin-walled region 30 comes into contact with the lower surface of the slider 26 at the time of the swinging. That is, the thin-walled region 30 and the slider 26 can not be separated from each other in the thickness direction and furthermore, damage to the conductive layer 6 by the slider 26 cannot be prevented.

However, in the suspension board with circuit 1, it is possible to effectively prevent the contact between the thin-walled region 30 and the slider 26 and damage to the wire 9 caused by the contact can be prevented.

In the suspension board with circuit 1, the swinging in the rear end portion of the slider 26 is more widely than in the front end portion thereof with respect to the thin-walled region 30 and therefore, the rear end portion of the slider 26 easily comes into contact with the conductive region 2. However, in the above-described suspension board with circuit 1, it is possible to effectively prevent the contact between the slider 26 and the thin-walled region 30 with respect to the conductive region 2 at the time of the swinging and damage to the wire 9 caused by the contact can be prevented.

In the above-described description, the thin-walled region 30 is, among the opposing region 29, defined as the conductive region 2 that is disposed between the first connecting portion 35 and the central portion 16. Alternatively, for example, though not shown, in addition to the description above or instead of the description above, the conductive region 2 along the central portion 16 and/or the conductive region 2 in the rear end portion of the stage 17 can be defined as the thin-walled region 30.

FIGS. 8 to 12 show sectional views of a thin-walled portion of another embodiment of the suspension board with circuit of the present invention.

In each figure to be described below, the same reference numerals are provided for members corresponding to each of those described above, and their detailed description is omitted.

In the above-described description, the thin-walled region 30 includes the thin-walled base portion 31 of the insulating base layer 7. Alternatively, for example, a thin-walled cover portion 32 and/or a thin-walled conductive portion 33 can be included additionally or independently.

Figure 8:
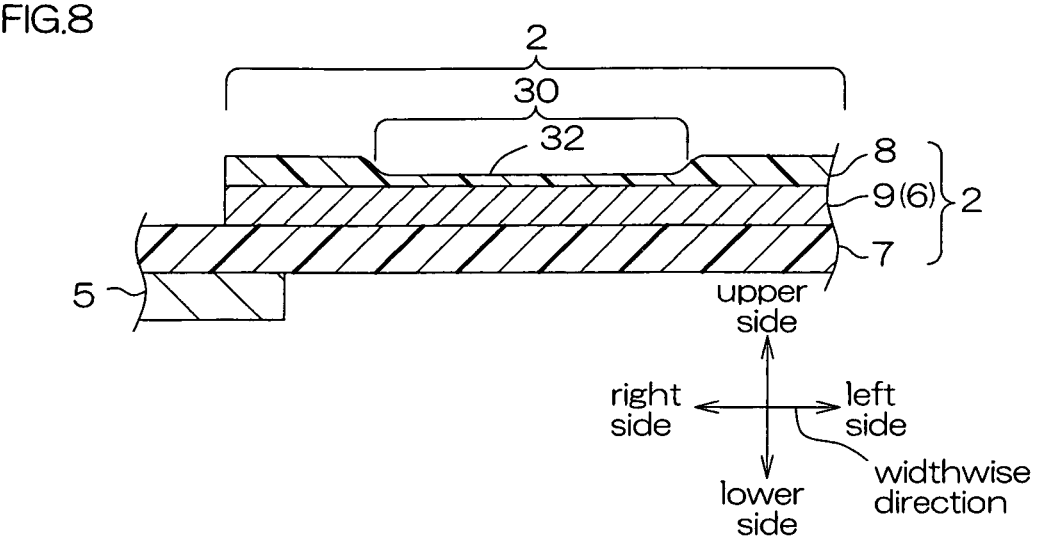
FIG. 8 shows a sectional view of a thin-walled portion (embodiment in which a thin-walled cover portion is provided) of another embodiment of the suspension board with circuit of the present invention.

In FIG. 8, the thin-walled region 30 includes the thin-walled cover portion 32 whose thickness is thinner than that of the insulating cover layer 8 in the conductive region 2 other than the opposing region 29.

Figure 9:
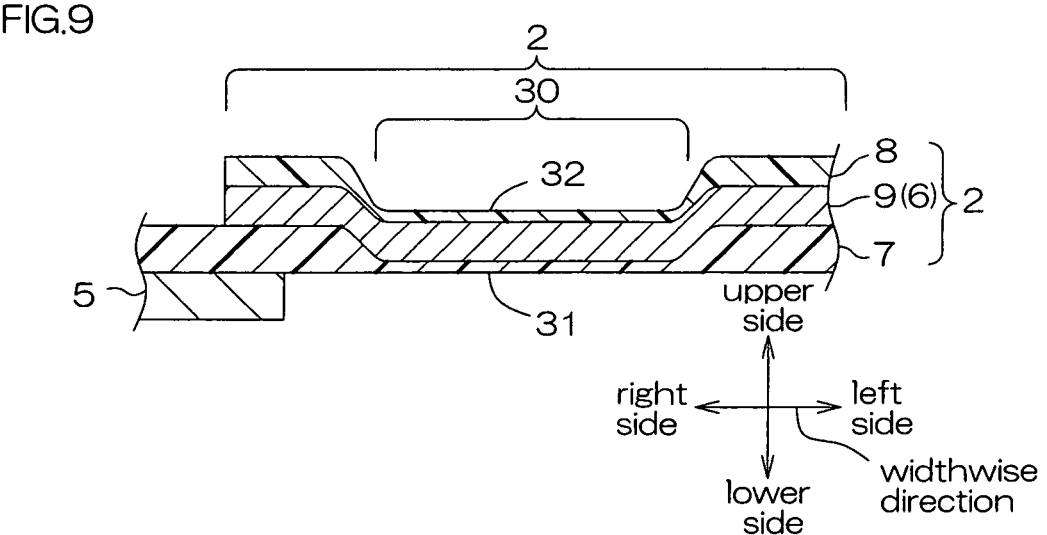
FIG. 9 shows a sectional view of the thin-walled portion (embodiment in which the thin-walled cover portion and a thin-walled base portion are provided) of another embodiment of the suspension board with circuit of the present invention.

In FIG. 9, the thin-walled region 30 includes the thin-walled base portion 31 and the thin-walled cover portion 32 other than the opposing region 29.

Figure 10:
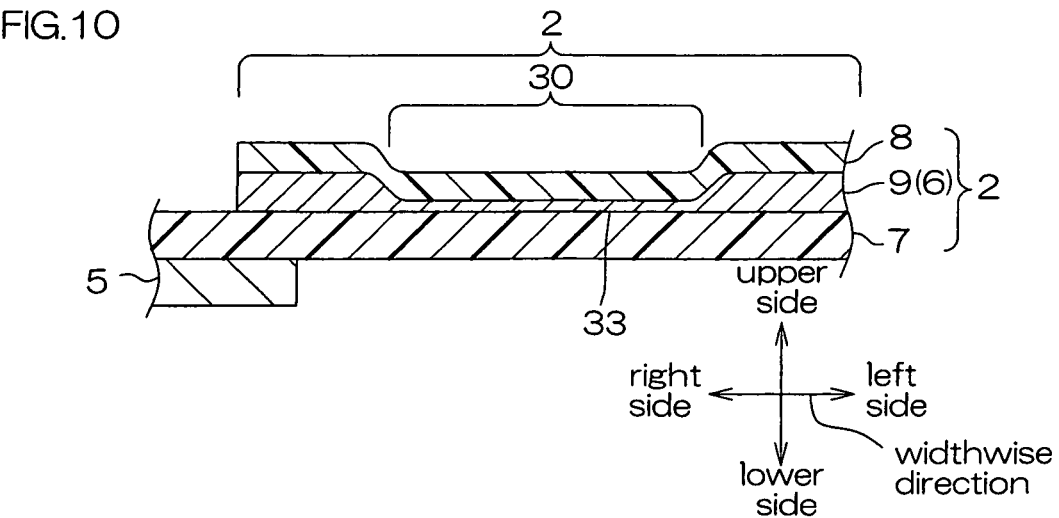
FIG. 10 shows a sectional view of the thin-walled portion (embodiment in which a thin-walled conductive portion is provided) of another embodiment of the suspension board with circuit of the present invention.

In FIG. 10, the thin-walled region 30 includes the thin-walled conductive portion 33 whose thickness is thinner than that of the conductive layer 6 in the conductive region 2.

Figure 11:
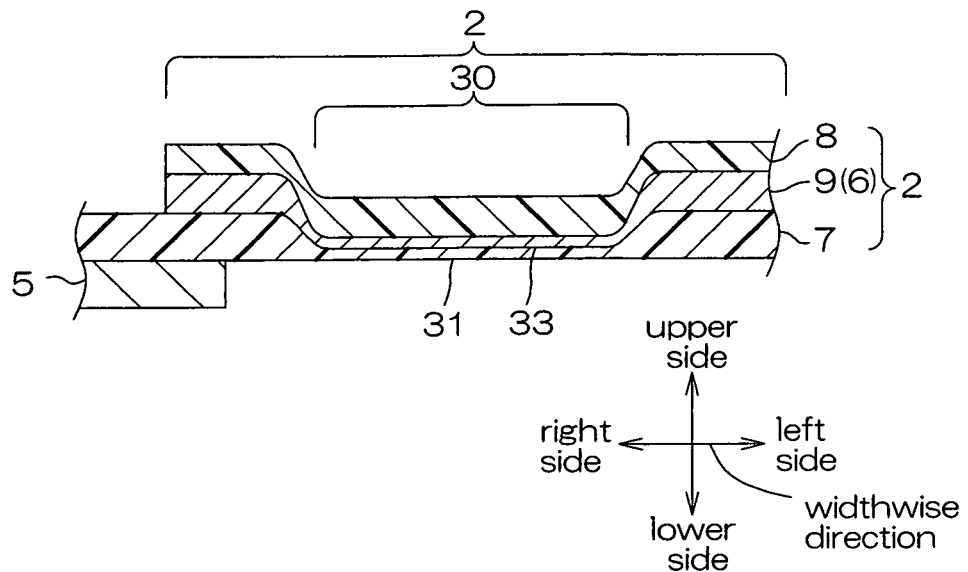
FIG. 11 shows a sectional view of the thin-walled portion (embodiment in which the thin-walled conductive portion and the thin-walled base portion are provided) of another embodiment of the suspension board with circuit of the present invention.

In FIG. 11, the thin-walled region 30 includes the thin-walled base portion 31 and the thin-walled conductive portion 33.

Figure 12:
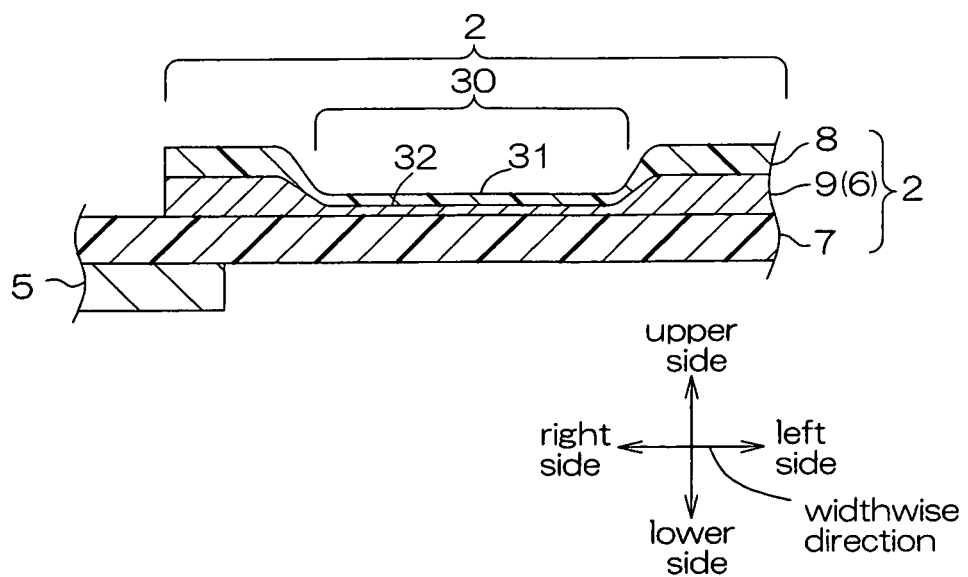
FIG. 12 shows a sectional view of the thin-walled portion (embodiment in which the thin-walled cover portion and the thin-walled conductive portion are provided) of another embodiment of the suspension board with circuit of the present invention.

In FIG. 12, the thin-walled region 30 includes the thin-walled conductive portion 33 and the thin-walled cover portion 32.

To form the thin-walled conductive portion 33 shown in FIGS. 10 to 12, for example, in the subtractive method, the conductive layer 6 is formed into a pattern. Thereafter, an etching resist is laminated on the portion other than the thin-walled conductive portion 33 and subsequently, the conductive layer 6 exposed from the etching resist is half etched and then, the etching resist is removed.

To form the insulating cover layer 8 including the thin-walled cover portion 32 shown in FIGS. 8, 9, and 12, for example, a varnish of the photosensitive insulating material is applied onto the insulating base layer 7 and is then dried to form a cover film.

Thereafter, the cover film is exposed to light via a gradation exposure photomask that is not shown (gradation exposure). The gradation exposure photomask includes a light shielding portion, a light semi-transmitting portion, and a light full transmitting portion in a pattern. The light full transmitting portion to the portion where the insulating cover layer 8 (except for the portion where the thin-walled cover portion 32 is formed) is formed, the light semi-transmitting portion to the portion where the thin-walled cover portion 32 is formed, and the light shielding portion to the portion where the insulating cover layer 8 is not formed, are respectively disposed in opposed relation to the cover film.

Then, the cover film is developed to be cured as required, so that the insulating cover layer 8 including the thin-walled cover portion 32 is formed with the above-described pattern.

In the thin-walled region 30 in FIG. 8, the up-down position of the upper surface of the conductive layer 6 is the same position of that of the upper surface of the conductive layer 6 in the conductive region 2 other than the opposing region 29. However, the thickness of the thin-walled cover portion 32 is thin, so that damage to the conductive layer 6 in the thin-walled region 30 caused by damage of the insulating cover layer 8 based on the contact between the lower surface of the slider 26 and the thin-walled cover portion 32 can be prevented.

Figure 13:
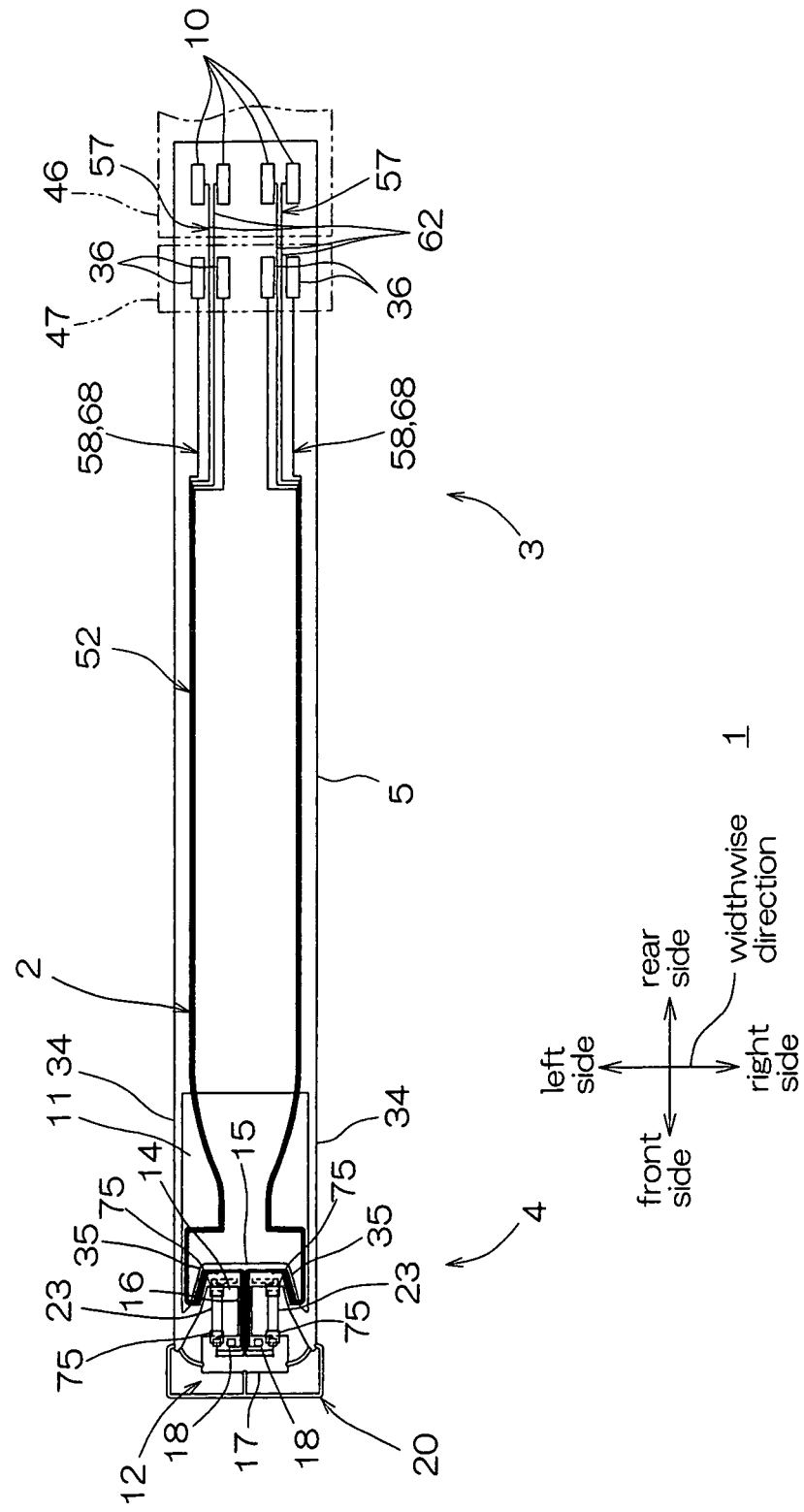
FIG. 13 shows a plan view of another embodiment (embodiment in which a pedestal is provided) of the suspension board with circuit of the present invention.
Figure 14:
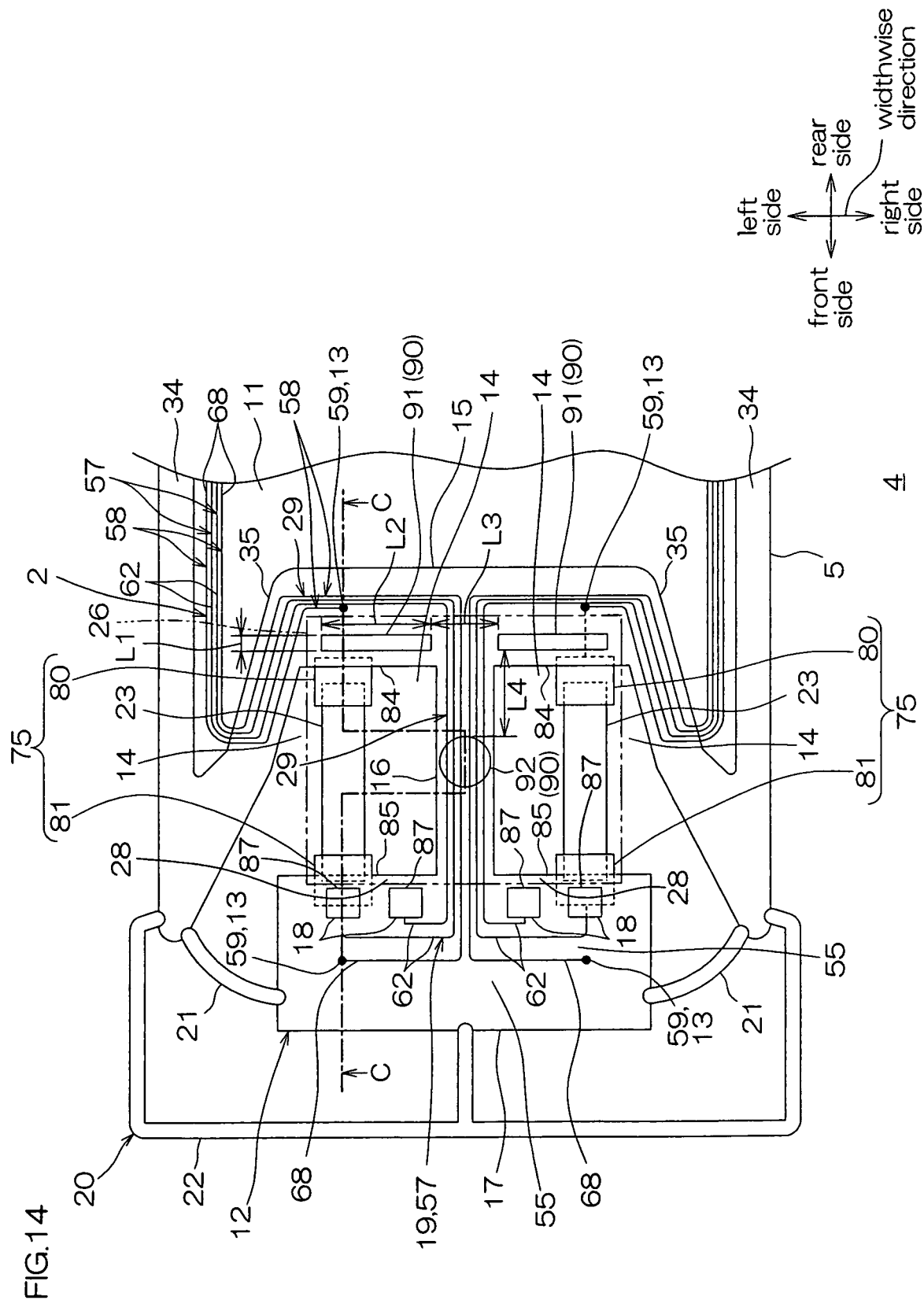
FIG. 14 shows a plan view of the gimbal portion of the suspension board with circuit shown in FIG. 13.
Figure 15:
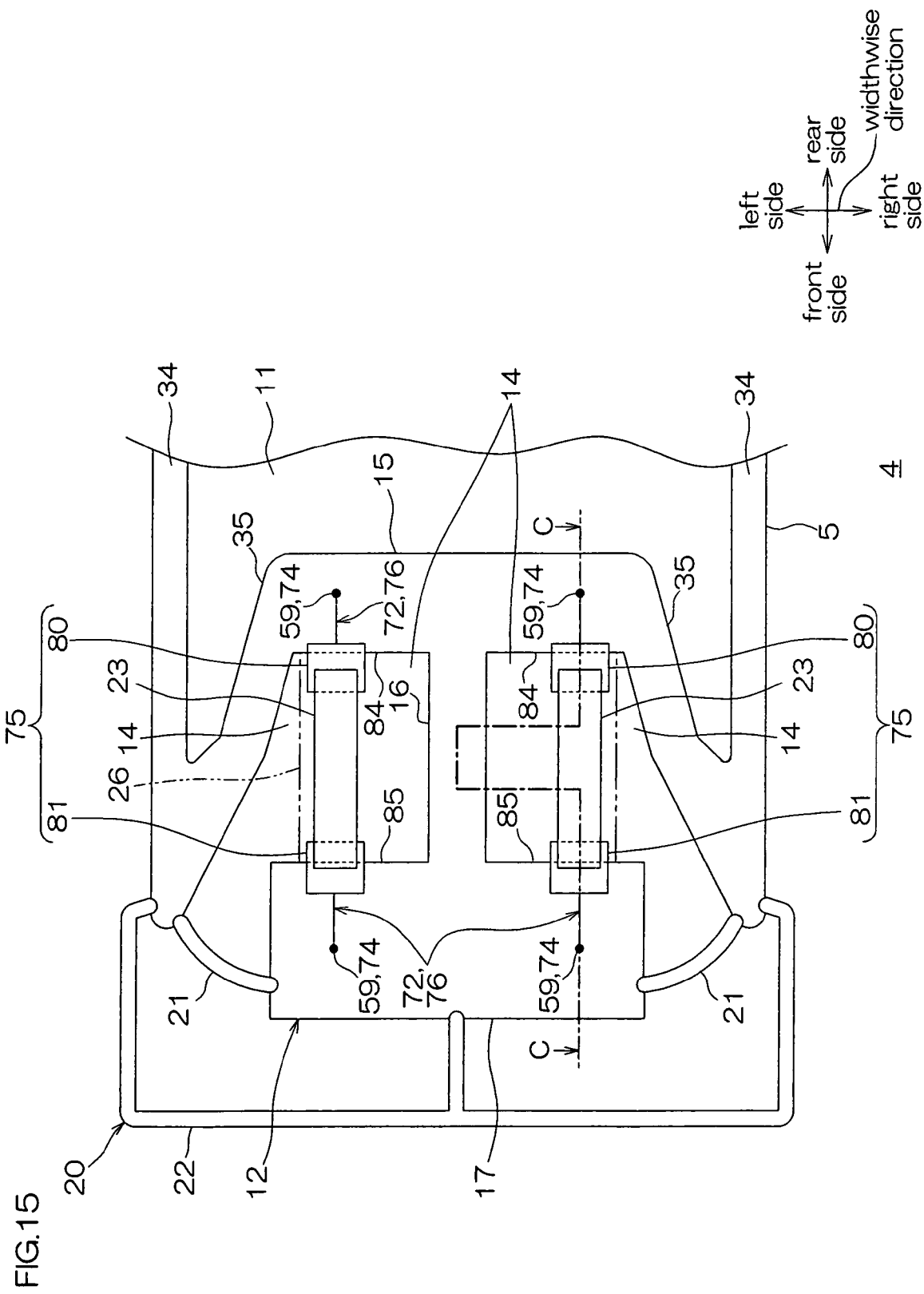
FIG. 15 shows a bottom view of the gimbal portion of the suspension board with circuit shown in FIG. 13.
Figure 16:
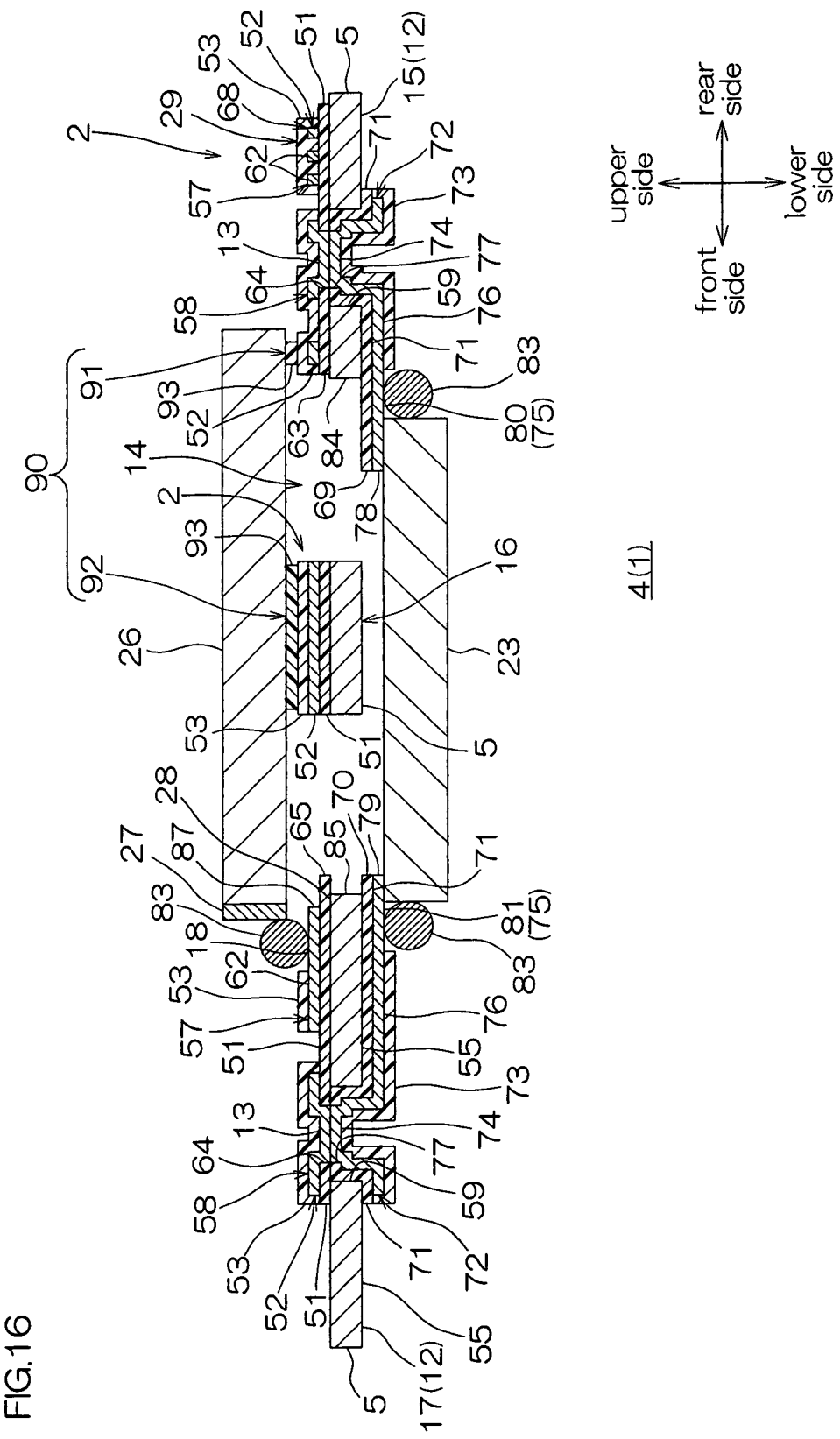
FIG. 16 shows a sectional view, taken along the line C-C of the gimbal portion shown in FIGS. 14 and 15.
Figure 17:
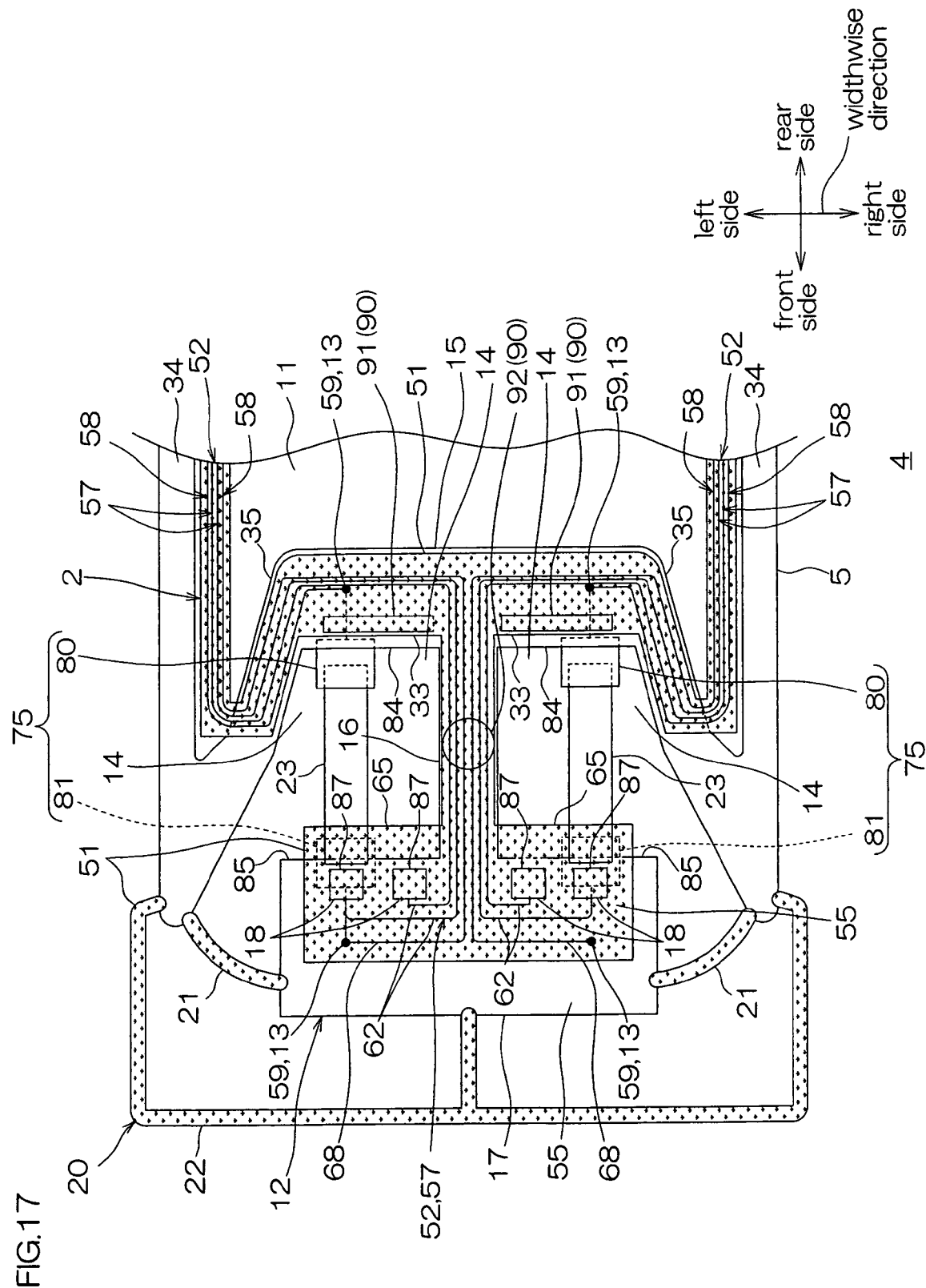
FIG. 17 shows a plan view of the gimbal portion shown in FIG. 14 and a plan view illustrating a first insulating base layer.
Figure 18:
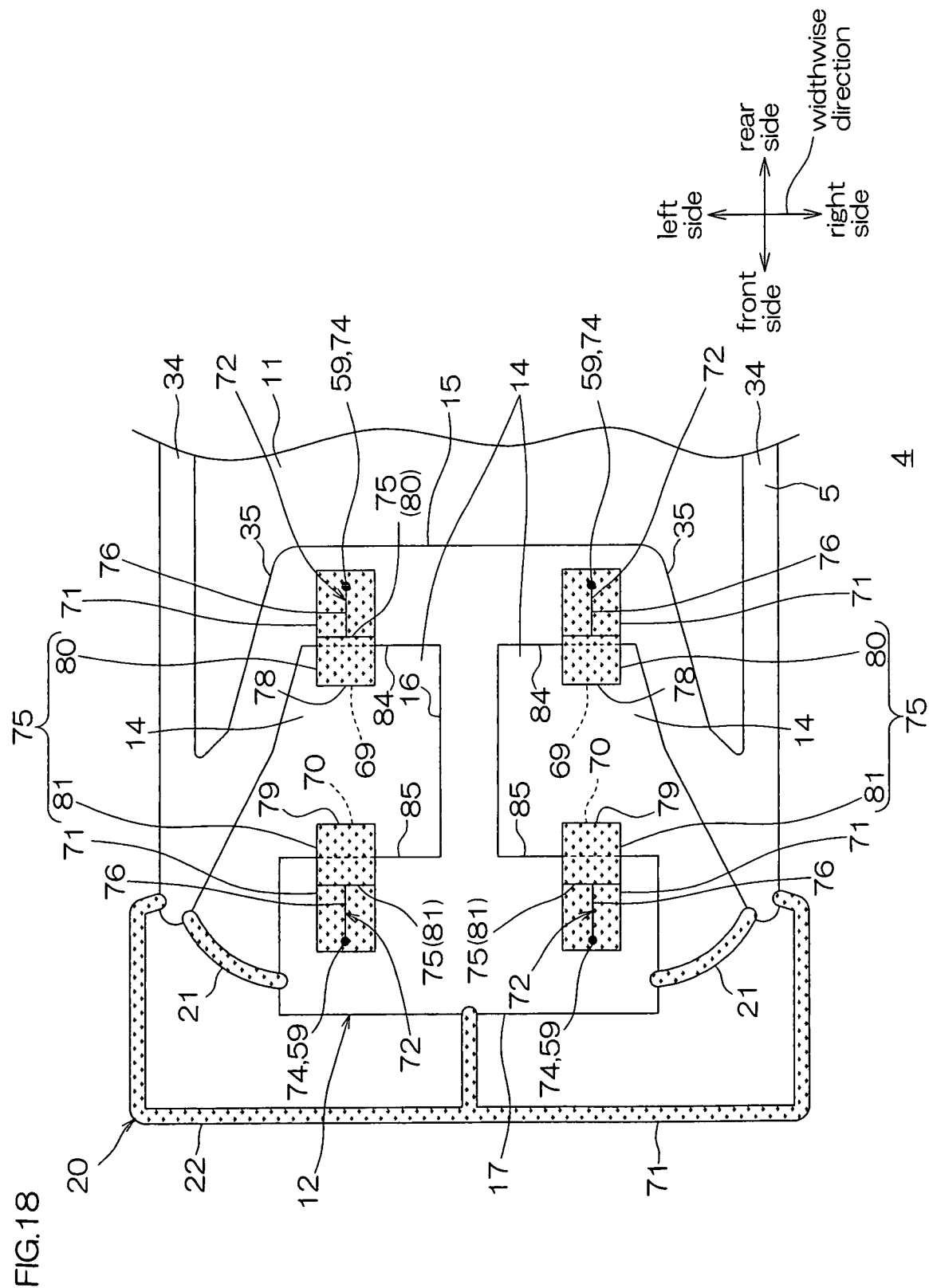
FIG. 18 shows a bottom view of the gimbal portion shown in FIG. 15 and a bottom view illustrating a second insulating base layer.
Figure 19:
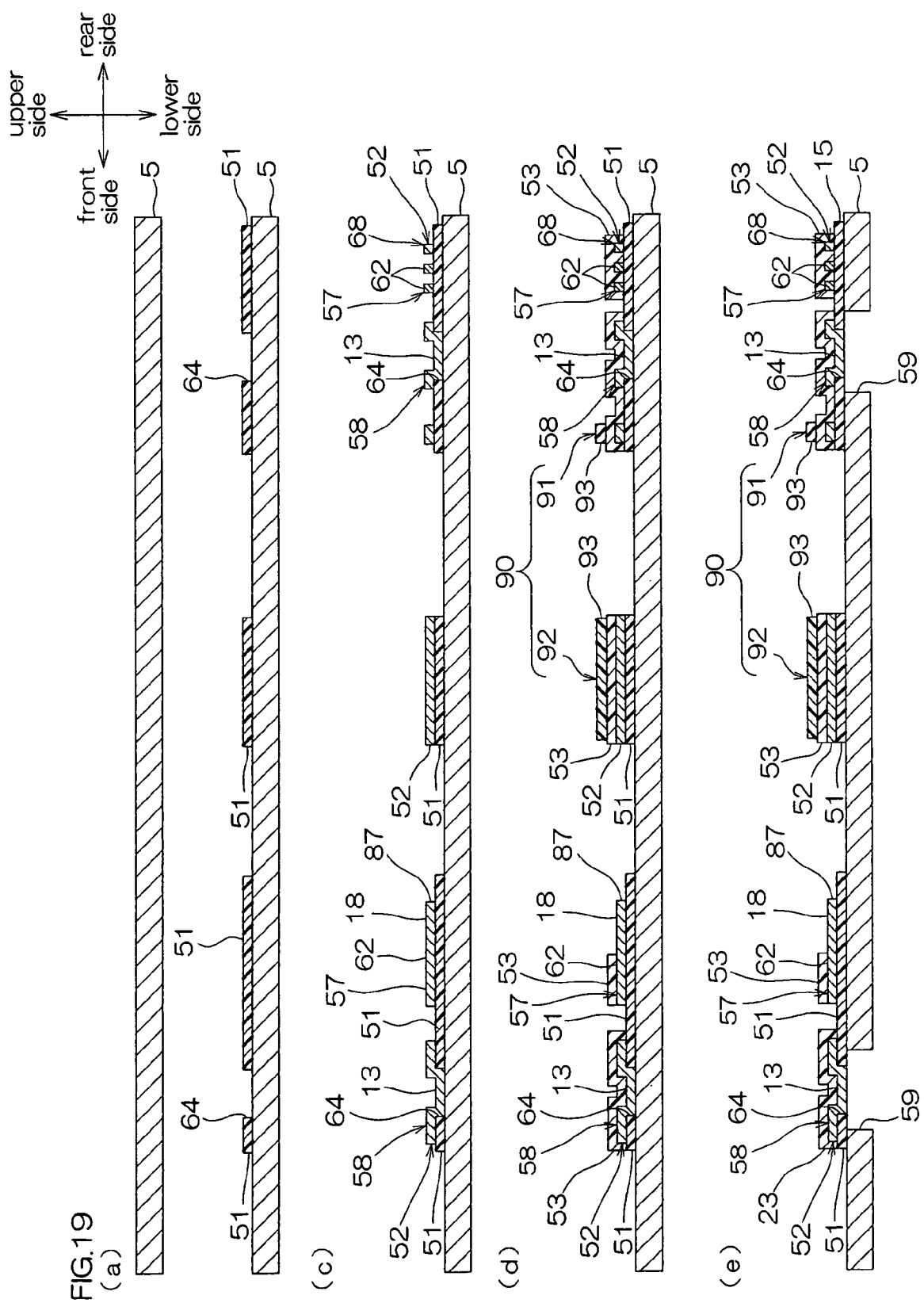
FIG. 19 shows process drawings for describing a method for producing the suspension board with circuit:
(a) illustrating a step of preparing the metal supporting board,
(b) illustrating a step of forming the first insulating base layer,
(c) illustrating a step of forming a first conductive pattern,
(d) illustrating a step of forming a first insulating cover layer, and
(e) illustrating a step of forming a conduction opening in the metal supporting board.
Figure 22:
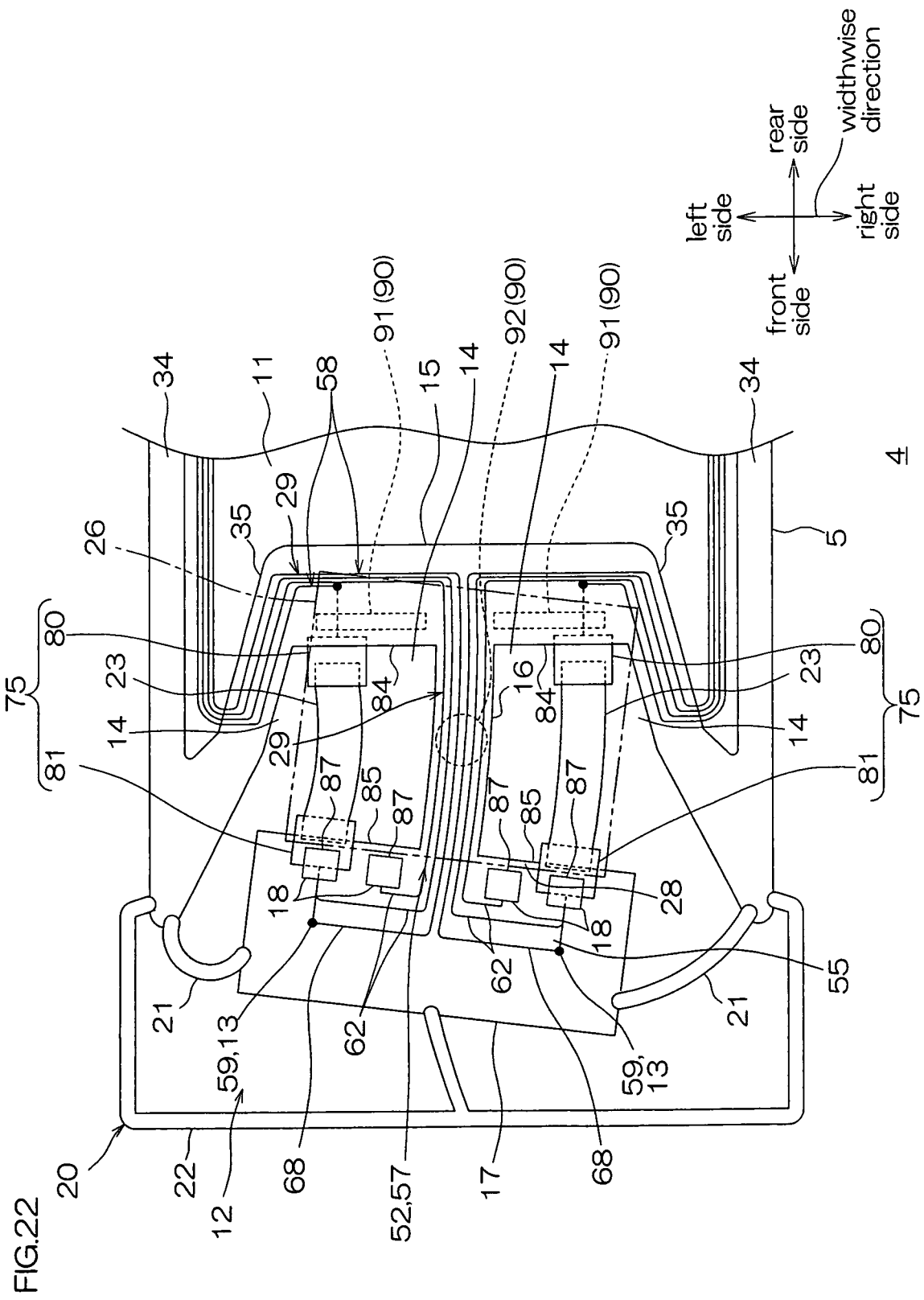
FIG. 22 shows a plan view illustrating a state where the stage of the gimbal portion is swung shown in FIG. 14.
Figure 23:
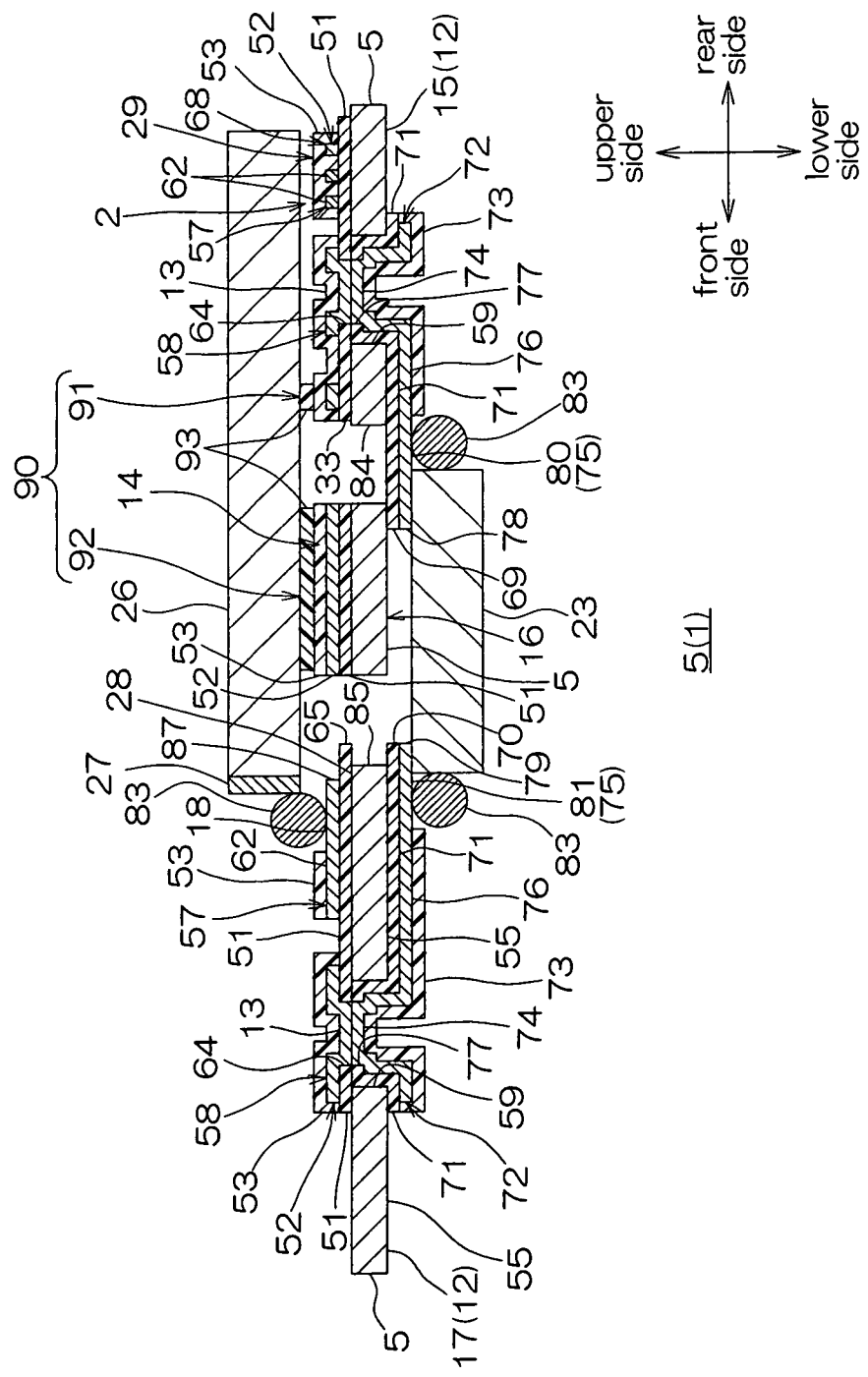
FIG. 23 shows a sectional view illustrating a state where the stage of the gimbal portion is swung shown in FIG. 16.

FIG. 13 shows a plan view of another embodiment (embodiment in which a pedestal is provided) of the suspension board with circuit of the present invention. FIGS. 14 and 15 each show a plan view and a bottom view of the gimbal portion of the suspension board with circuit shown in FIG. 13. FIG. 16 shows a sectional view, taken along the line C-C of the gimbal portion shown in FIGS. 14 and 15. FIG. 17 shows a plan view of the gimbal portion shown in FIG. 14 and a plan view illustrating a first insulating base layer. FIG. 18 shows a bottom view of the gimbal portion shown in FIG. 15 and a bottom view illustrating a second insulating base layer. FIGS. 19 to 21 show process drawings for describing a method for producing the suspension board with circuit. FIG. 22 shows a plan view illustrating a state where the stage of the gimbal portion is swung shown in FIG. 14. FIG. 23 shows a sectional view illustrating a state where the stage of the gimbal portion is swung shown in FIG. 16.

In FIGS. 13, 14, and 22, a first insulating base layer 51 and a first insulating cover layer 53 to be described later are omitted to clearly show the relative arrangement of a first conductive pattern 52 to be described later.

In FIG. 15, a second insulating base layer 71 and a second insulating cover layer 73 to be described later are omitted to clearly show the relative arrangement of a second conductive pattern 72 to be described later.

In addition, in FIG. 17, the first insulating cover layer 53 to be described later is omitted to clearly show the relative arrangement of the first conductive pattern 52 and the first insulating base layer 51 to be described later.

Furthermore, in FIG. 15, the second insulating cover layer 73 to be described later is omitted to clearly show the relative arrangement of the second conductive pattern 72 and the second insulating base layer 71 to be described later.

In FIGS. 13 and 16, the suspension board with circuit 1 is mounted with the slider 26 mounted with the magnetic head 27 and the piezoelectric element 23, and the suspension board with circuit 1 is mounted on a hard disk drive (not shown).

As shown in FIG. 13, the suspension board with circuit 1 is formed into a flat belt shape extending in the front-rear direction and integrally includes the main body portion 3 and the gimbal portion 4.

The main body portion 3 is formed into a generally rectangular shape in plane view extending in the front-rear direction. The main body portion 3 is, when the suspension board with circuit 1 is mounted on the hard disk drive, electrically connected to an external circuit board 46 (phantom lines) such as a read/write board and a power source 47 (phantom lines) with being supported by a load beam (not shown) in the hard disk drive.

In the gimbal portion 4, the board opening 11 is formed into a generally rectangular shape in plane view penetrating in the thickness direction.

As shown in FIG. 14, the gimbal portion 4 includes the outrigger portion 34 and the tongue portion 12.

The tongue portion 12 integrally includes the basal portion 15, the stage 17, and the central portion 16.

The rear end portion of the stage 17 is defined as the mounting region 28 on which the slider 26 is mounted.

In the front-rear direction, a communicating space 14 is defined as a spacing surrounded between the both widthwise end portions of the basal portion 15 and the widthwise end portion of the stage 17.

That is, the communicating space 14 is divided on the both widthwise sides of the central portion 16 and each of the communicating spaces 14 is formed so as to penetrate in the thickness direction of the suspension board with circuit 1.

In the stage 17, a wire folding portion 55 is defined in the central portion of the front-rear direction.

The wire folding portion 55 is divided into a generally rectangular shape in plane view that is long in the widthwise direction as a region in which the first conductive pattern 52 to be described later is folded in the stage 17.

The stage 17 is connected to the outrigger portion 34 with the second connecting portion 20. The second connecting portion 20 includes the curved portion 21 and the E-shaped portion 22.

The central portion 16 is formed so as to be capable of being curved in the widthwise direction with the width narrow. The central portion 16 is formed to have the width for ensuring the region in which a second pedestal 92 to be described next is provided.

In the tongue portion 12, a pedestal 90 for supporting the slider 26 is provided.

The pedestal 90 includes a first pedestal 91 provided in the basal portion 15 and the second pedestal 92 provided in the central portion 16.

The first pedestal 91 is disposed on the front side portion of the basal portion 15 and to be specific, is disposed not to be overlapped with the first conductive pattern 52 to be described later when projected in the thickness direction. A plurality (two pieces) of the first pedestals 91 are spaced in opposed relation to each other in the widthwise direction. Each of the first pedestals 91 is formed so as to extend along the widthwise direction and to be specific, is formed into a generally rectangular shape in plane view that is long in the widthwise direction.

On the other hand, the second pedestal 92 is formed into a generally circular shape in plane view and is provided at the front side of the first pedestal 91 at spaced intervals thereto. To be specific, the second pedestal 92 is disposed in the central portion of the front-rear direction of the central portion 16. The second pedestal 92 is disposed so as to be overlapped with the first conductive pattern 52 in the central portion 16 in the thickness direction.

As shown in FIG. 16, the pedestal 90 is formed so that the up-down positions of the upper surfaces thereof are the same in height to each other. To be specific, the upper surfaces of each of the first pedestals 91 and the second pedestal 92 are formed so as to be in a linear state when projected in the front-rear direction or the widthwise direction.

The upper surfaces of each of the first pedestals 91 and the second pedestal 92 are formed in a flat state.

Therefore, the pedestal 90 can come into contact with the slider 26 so that the slider 26 is capable of frictionally sliding.

The suspension board with circuit 1 includes the metal supporting board 5, the first insulating base layer 51 that is formed on the metal supporting board 5, the first conductive pattern 52 that is formed on the first insulating base layer 51 as a conductive layer, and the first insulating cover layer 53 that is formed on the first insulating base layer 51 so as to cover the first conductive pattern 52.

As shown in FIG. 13, the metal supporting board 5 extends in the front-rear direction and is formed into substantially the same outer shape as that of the above-described suspension board with circuit 1.

As shown in FIG. 16, a conduction opening 59 is formed in the metal supporting board 5.

As referred in FIG. 14, a plurality (four pieces) of the conduction openings 59 are provided in the basal portion 15 and the stage 17 at spaced intervals to each other. To be specific, each of the conduction openings 59 is formed on the both widthwise end portions of the basal portion 15 and on the both widthwise end portions of the stage 17. Each of the conduction openings 59 is formed into a generally circular shape in plane view penetrating in the thickness direction of the metal supporting board 5.

As shown in FIGS. 16 and 17, the first insulating base layer 51 is formed so as to correspond to the portion in which the first conductive pattern 52 is formed.

To be specific, the first insulating base layer 51 is formed on the upper surfaces of the main body portion 3 and the gimbal portion 4. In particular, the first insulating base layer 51 is formed into a pattern in which the upper surfaces of the front end edges (except for the central portion in the widthwise direction) and the rear end edges of the metal supporting board 5 of the basal portion 15 are exposed; and the upper surfaces of the both widthwise end edges of the metal supporting board 5 of the central portion 16 are exposed; and the upper surfaces of the front end edges and the both widthwise end edges of the stage 17 are exposed.

The first insulating base layer 51 is formed so as to cover the front end portion of the communicating space 14.

That is, a rear end edge 65 of the first insulating base layer 51 corresponding to the stage 17 protrudes toward the rear side compared to the front end edge of the communicating space 14 when projected in the thickness direction.

A front end edge 63 of the first insulating base layer 51 corresponding to the basal portion 15 is disposed toward the rear side compared to the rear end edge of the communicating space 14 when projected in the thickness direction.

The first insulating base layer 51 forms the conductive region 2 together with the first conductive pattern 52 to be described next.

In addition, the first insulating base layer 51 forms the second connecting portion 20.

Furthermore, as shown in FIG. 16, the first insulating base layer 51 covers the circumference end edge of each of the conduction openings 59 of the metal supporting board 5 in a circular ring state. In this way, in the first insulating base layer 51, a plurality (four pieces) of first base through holes 64 corresponding to each of the conduction openings 59 are formed into a generally circular shape in plane view that shares the center with the conduction opening 59.

As shown in FIGS. 13 and 17, the first conductive pattern 52 includes a head-side pattern 57 that is electrically connected to the magnetic head 27 (FIG. 16) and an element-side pattern 58 that is electrically connected to the piezoelectric element 23 (FIG. 16).

The head-side pattern 57 integrally includes the head-side terminal 18, the external terminal 10 (FIG. 13), and a signal wire 62 for connecting the head-side terminal 18 to the external terminal 10.

As shown in FIGS. 14 and 17, a plurality (four pieces) of the head-side terminals 18 are arranged on the rear end portion of the both widthwise end portions of the stage 17. To be specific, each of the head-side terminals 18 is formed into a generally rectangular shape in plane view and is arranged on the rear side of the wire folding portion 55. Each of the head-side terminals 18 is arranged in alignment at spaced intervals to each other in the widthwise direction. The head-side terminals 18 are, when projected in the front-rear direction, arranged on the both widthwise sides of the central portion 16 at spaced intervals to each other.

As shown in FIGS. 16 and 17, a rear end edge 87 of the head-side terminal 18 is disposed so as to retract toward the front side compared to the rear end edge 65 of the first insulating base layer 51 in the stage 17.

As shown in FIG. 13, in the rear end portion of the main body portion 3, the external terminals 10 are arranged in alignment at spaced intervals to each other in the widthwise direction. A plurality (four pieces) of the external terminals 10 are provided so as to correspond to the head-side terminals 18. The external circuit board 46 that is shown in phantom lines is connected to the external terminal 10.

A plurality (four pieces) of the signal wires 62 are formed at spaced intervals to each other so as to connect the external terminals 10 to the corresponding head-side terminals 18.

To be specific, the signal wires 62 are arranged in the following manner. The rear ends of the signal wires 62 are continuous to the external terminals 10. To be specific, in the rear end portion of the main body portion 3, the signal wires 62 extend from the external terminals 10 toward the front side and in the middle of the front-rear direction of the main body portion 3, bend toward the both widthwise sides in two bunches in a branched state. Thereafter, the signal wires 62, in the middle of the front-rear direction of the main body portion 3, bend toward the front side in the both widthwise end portions and extend toward the front end portion of the main body portion 3 along the widthwise outer end edges. As shown in FIGS. 14 and 17, in the gimbal portion 4, the signal wires 62 pass thorough the board opening 11 to then reach the first connecting portion 35.

Thereafter, the signal wires 62 extend along the first connecting portion 35 obliquely toward the rear side in the widthwise inner side to reach the both widthwise end portions of the basal portion 15. After bending toward the widthwise inner side, the signal wires 62 are united in the widthwise center of the basal portion 15. Then, the signal wires 62 extend along the central portion 16 toward the front side and in the wire folding portion 55 of the stage 17, bend toward the both widthwise sides in two bunches in a branched state. Thereafter, the signal wires 62 extend along the rear end edges of the stage 17 toward the both widthwise outer sides and then are folded toward the rear side to be connected to the front end portion of the head-side terminals 18.

The signal wires 62 are, in the basal portion 15, disposed at the rear side of the first pedestal 91 at spaced intervals thereto and are formed linearly along the widthwise direction.

As shown in FIGS. 13, 14, and 16, the element-side pattern 58 integrally includes a supply-side terminal 36, a top-side conduction portion 13, and a top-side power source wire 68 for connecting the supply-side terminal 36 to the top-side conduction portion 13.

As shown in FIG. 13, a plurality (four pieces) of the supply-side terminals 36 are, in the rear end portion of the main body portion 3, provided at the front side of the external terminal 10 at spaced intervals thereto. Each of the supply-side terminals 36 is formed into a generally rectangular shape in plane view and is arranged in alignment at spaced intervals to each other in the widthwise direction. The power source 47 that is shown in phantom lines is connected to the supply-side terminal 36.

As shown in FIG. 16, a plurality (four pieces) of the top-side conduction portions 13 are formed so as to be each filled in each of the first base through holes 64.

As shown in FIGS. 13 and 14, a plurality (four pieces) of the top-side power source wires 68 are formed at spaced intervals to each other so as to be connected to the top-side conduction portions 13 and the supply-side terminals 36. The top-side power source wires 68 are disposed, over the main body portion 3 and the gimbal portion 4, at the outer sides of the signal wires 62 at spaced intervals thereto.

The first insulating base layer 51 and the first insulating cover layer 53 are formed around the first conductive pattern 52, to be specific, the signal wire 62, the top-side conduction portion 13, and the top-side power source wire 68, in sectional view. The signal wire 62, the top-side conduction portion 13, and the top-side power source wire 68 form the conductive region 2 together with the first insulating base layer 51 and the first insulating cover layer 53.

As shown in FIG. 16, the first insulating cover layer 53 is formed corresponding to the portion in which the first conductive pattern 52 is formed.

To be specific, the first insulating cover layer 53 is formed in a pattern in which the first insulating cover layer 53, corresponding to the head-side pattern 57, exposes the external terminal 10 (ref: FIG. 13) and the head-side terminal 18 and covers the signal wire 62. The first insulating cover layer 53 is formed in a pattern in which the first insulating cover layer 53, corresponding to the element-side pattern 58, exposes the supply-side terminal 36 (ref: FIG. 13) and covers the top-side power source wire 68 and the top-side conduction portion 13.

The above-described first insulating base layer 51, the first conductive pattern 52, and the first insulating cover layer 53 form each of the pedestals 90 together with a top-side supporting layer 93 (described later).

That is, as shown in FIG. 16, the pedestal 90 includes the first insulating base layer 51, the first conductive pattern 52 that is formed thereon, the first insulating cover layer 53 that is formed on the first insulating base layer 51 so as to cover the first conductive pattern 52, and the top-side supporting layer 93 that is formed on the first insulating cover layer 53.

In the pedestal 90, the top-side supporting layer 93 is formed a little smaller than the first insulating cover layer 53 in plane view.

The suspension board with circuit 1 includes the second insulating base layer 71 that is formed below the metal supporting board 5, the second conductive pattern 72 that is formed below the second insulating base layer 71, ant the second insulating cover layer 73 that is formed below the second insulating base layer 71 so as to cover the second conductive pattern 72.

As shown in FIGS. 16 and 18, the second insulating base layer 71 is formed corresponding to the portion in which the second conductive pattern 72 to be described next is formed.

In detail, the second insulating base layer 71 is formed so as to face the inside of the communicating space 14 from the basal portion 15 and the stage 17. To be specific, four pieces of the second insulating base layers 71 are provided corresponding to four pieces of the conduction openings 59. Each of the second insulating base layers 71 is disposed independently at spaced intervals to each other in the front-rear direction and the widthwise direction and to be specific, is disposed on the both widthwise end portions of the basal portion 15 and the stage 17.

Each of the second insulating base layers 71 is, in bottom view, formed into a generally rectangular shape that extends long in the front-rear direction so as to include each of the conduction openings 59.

The second insulating base layer 71 corresponding to the basal portion 15 is formed over the both widthwise end portions of the basal portion 15 and the rear end portion of the communicating space 14.

In the gimbal portion 4, when projected in the thickness direction, a front end edge 69 of the second insulating base layer 71 corresponding to the basal portion 15 protrudes toward the front side (that is, toward the center of the front-rear direction of the communicating space 14) compared to the rear end edge of the communicating space 14. That is, the second insulating base layer 71 corresponding to the basal portion 15 is, when projected in the thickness direction, formed so as to pass over a front end edge 84 of the metal supporting board 5 along the widthwise direction in the front-rear direction.

The second insulating base layer 71 corresponding to the stage 17 is formed over the both widthwise end portions of the stage 17 and the front end portion of the communicating space 14. The second insulating base layer 71 corresponding to the stage 17 is formed so that a rear end edge 70 thereof is, when projected in the thickness direction, overlapped with the rear end edge 65 of the first insulating base layer 51.

That is, in the gimbal portion 4, when projected in the thickness direction, the rear end edge 70 of the second insulating base layer 71 protrudes toward the rear side (that is, toward the center of the front-rear direction of the communicating space 14) compared to the front end edge of the communicating space 14.

That is, the second insulating base layer 71 corresponding to the stage 17 is, when projected in the thickness direction, formed so as to pass over a rear end edge 85 of the metal supporting board 5 along the widthwise direction in the front-rear direction.

In FIG. 16, in the basal portion 15 and the stage 17, the second insulating base layer 71 covers the circumference end edge of each of the conduction openings 59 of the metal supporting board 5 in a circular ring state. In this way, in the second insulating base layer 71, a plurality (four pieces) of second base through holes 77 corresponding to each of the conduction openings 59 are formed into a generally circular shape in plane view that shares the center with the conduction opening 59.

As shown in FIG. 18, the second insulating base layer 71 forms the second connecting portion 20 together with the first insulating base layer 51.

In FIG. 15, the second conductive pattern 72 integrally includes a back-side conduction portion 74, an element-side terminal 75, and a back-side power source wire 76 for connecting the back-side conduction portion 74 to the element-side terminal 75.

In FIG. 16, a plurality (four pieces) of the back-side conduction portions 74 are formed so as to be each filled in each of the second base through holes 77.

In this way, the top-side conduction portion 13 and the back-side conduction portion 74 are, in the first base through hole 64 and the second base through hole 77, directly in contact with each other and are electrically connected to each other in the thickness direction.

In FIG. 15, the element-side terminals 75 are disposed independently on the front end portion of the second insulating base layer 71 corresponding to the basal portion 15 and on the rear end portion of the second insulating base layer 71 corresponding to the stage 17. Each of the element-side terminals 75 faces the communicating space 14 and a plurality (four pieces) thereof are provided at spaced intervals to each other in the widthwise direction and the front-rear direction so as to correspond to each of the back-side conduction portions 74. Each of the element-side terminals 75 is formed into a generally rectangular shape in bottom view and the both widthwise end edges thereof are, when projected in the thickness direction, formed at the same position as those of the second insulating base layer 51.

The element-side terminal 75 includes an element-side rear terminal 80 that is provided in the rear end portion of the communicating space 14 and an element-side front terminal 81 that is provided at the front side of the element-side rear terminal 80 at spaced intervals thereto.

A plurality (two pieces) of the element-side rear terminals 80 are, in the basal portion 15, arranged in parallel at spaced intervals to each other in the widthwise direction.

A plurality (two pieces) of the element-side front terminals 81 are, in the stage 17, arranged in parallel at spaced intervals to each other in the widthwise direction. The element-side front terminals 81 each are provided corresponding to the head-side terminals 18 at the widthwise outermost sides. To be specific, as shown in FIG. 16, the element-side front terminals 81 each are, when projected in the thickness direction, arranged so as to be overlapped with the rear side portions of the head-side terminals 18 at the widthwise outermost sides.

As shown in FIG. 15, the element-side rear terminal 80 on one side in the widthwise direction and the element-side front terminal 81 on one side in the widthwise direction are provided in pairs across the communicating space 14 on one side in the widthwise direction of the central portion 16. The element-side rear terminal 80 on the other side in the widthwise direction and the element-side front terminal 81 on the other side in the widthwise direction are provided in pairs across the communicating space 14 on the other side in the widthwise direction of the central portion 16.

As shown in FIG. 16, a front end edge 78 of the element-side rear terminal 80 is, when projected in the thickness direction, disposed so as to become generally flush with the front end edge 69 of the second insulating base layer 71 corresponding to the basal portion 15.

A rear end edge 79 of the element-side front terminal 81 is, when projected in the thickness direction, disposed so as to become generally flush with the rear end edge 70 of the second insulating base layer 71 corresponding to the stage 17.

The rear end edge 79 of the element-side front terminal 81 is disposed in proximity to the rear side of the rear end edge 87 of the head-side terminal 18 at minute spaced intervals thereto.

As shown in FIGS. 16 and 18, a plurality (four pieces) of the back-side power source wires 76 are formed at spaced intervals to each other so as to connect the element-side terminals 75 to the corresponding back-side conduction portions 74.

As shown in FIG. 16, the second insulating cover layer 73 is, in the gimbal portion 4, formed so as to correspond to the second conductive pattern 72. To be specific, the second insulating cover layer 73 is formed so as to expose the element-side terminal 75 and to cover the back-side power source wire 76 and the back-side conduction portion 74.

As shown in FIGS. 14 and 16, the slider 26 (phantom lines in FIG. 14) and the piezoelectric element 23 are mounted on the suspension board with circuit 1.

The slider 26 is mounted on the front end of a load beam (not shown) of a hard disk drive (not shown) together with the suspension board with circuit 1. When the hard disk drive (not shown) is activated, the slider 26 travels relatively with respect to a magnetic disk (not shown) and is floated at minute spaced intervals thereto.

The slider 26 is formed into a generally rectangular shape in plane view and a generally rectangular shape in side sectional view. As shown in phantom lines in FIG. 14, the slider 26 is, when projected in the thickness direction, disposed so that the front end portion thereof is overlapped with the rear end portion of the stage 17 and the rear end portion thereof is overlapped with the front end portion of the basal portion 15. The slider 26 is, when projected in the thickness direction, disposed so that the middle portion in the front-rear direction thereof that is also the middle portion in the widthwise direction thereof is overlapped with the central portion 16.

In addition, the slider 26 is disposed so that the middle portion and the rear end portion in the front-rear direction thereof, when projected in the thickness direction, include the pedestal 90.

To be specific, the rear end edge of the slider 26 is disposed so as to be along the conductive region 2 (the opposing region 29 to be described later) that is formed along the widthwise direction in the basal portion 15 and is, when projected in the thickness direction, disposed in parallel at the front side of the conductive region 2 at minute spaced intervals thereto.

As shown in FIG. 16, in the front end portion of the slider 26, the magnetic head 27 is mounted over the entire thickness direction of the slider 26. The magnetic head 27 is electrically connected to the head-side terminal 18 in the front-rear direction via the solder ball 83.

In this way, the front end portion of the slider 26 is fixed to the stage 17. To be specific, the slider 26 is fixed to the stage 17 so that the front end edge thereof is opposed to the mounting region 28 of the stage 17 in the thickness direction.

The rear end portion of the slider 26 is supported so as to be capable of sliding (swinging) in the plane direction (the direction perpendicular to the thickness direction) with respect to the basal portion 15.

That is, the slider 26 is provided so that the lower surface thereof is in contact with the upper surface of each of the pedestals 90 so as to be capable of frictionally sliding.

The rear end portion of the slider 26 is, when projected in the thickness direction, overlapped with the element-side rear terminal 80.

As shown in FIGS. 14 and 15, the piezoelectric element 23 is capable of stretching and shrinking in the front-rear direction and is formed into a generally rectangular shape in plane view that is long in the front-rear direction. As shown in FIG. 16, the piezoelectric element 23 is disposed below the slider 26 at spaced intervals thereto.

The piezoelectric element 23 is, when projected in the thickness direction, disposed in the communicating space 14 and is disposed so as to cross over the communicating space 14 in the front-rear direction.

To be specific, as shown in FIGS. 14 and 15, the piezoelectric element 23 is mounted so as to be disposed between two sets of a pair of the element-side terminals 75 (the element-side front terminal 81 and the element-side rear terminal 80) that sandwich the communicating space 14 in the front-rear direction.

To be more specific, as shown in FIG. 16, the terminal of the front end portion of each of the piezoelectric elements 23 is connected to the lower surface of the element-side front terminal 81 and they are electrically connected to each other via the solder balls 83. In addition, the terminal of the rear end portion of each of the piezoelectric elements 23 is connected to the lower surface of the element-side rear terminal 80 and they are electrically connected to each other via the solder balls 83.

In this way, each of the piezoelectric elements 23 is fixed to the respective element-side front terminal 81 and element-side rear terminal 80.

As shown in FIG. 14, the piezoelectric element 23 is, when projected in the thickness direction, overlapped with the slider 26. To be specific, the entire piezoelectric element 23 is, when projected in the thickness direction, included in the slider 26.

Electric power is supplied to the piezoelectric element 23 from the power source 47 (phantom lines in FIG. 13) via the element-side pattern 58 and the second conductive pattern 72, so that the piezoelectric element 23 stretches and shrinks by controlling the electric voltage.

Next, a method for producing the suspension board with circuit 1 is described with reference to FIGS. 19 to 21.

In this method, as shown in FIG. 19 (a), the metal supporting board 5 is first prepared.

Next, as shown in FIG. 19 (b), a varnish of the photosensitive insulating material is applied onto the metal supporting board 5 and is then dried. Thereafter, the dried varnish is exposed to light and is then developed to be heat cured, so that the first insulating base layer 51 is formed with the above-described pattern.

At the same time with this, the first insulating base layer 51 corresponding to the pedestal 90 (ref: FIG. 19 (d)) is formed.

An example of the material for forming the first insulating base layer 51 includes an insulating material such as a synthetic resin including polyimide resin, polyamide imide resin, acrylic resin, polyether nitrile resin, polyether sulfone resin, polyethylene terephthalate resin, polyethylene naphthalate resin, polyvinyl chloride resin. Preferably, polyimide resin is used.

The first insulating base layer 51 has a thickness in the range of, for example, 1 to 35 µm, or preferably 3 to 15 µm.

Each of the first base through holes 64 has a diameter in the range of, for example, 20 to 280 µm, or preferably 40 to 200 µm.

Next, as shown in FIG. 19 (c), the first conductive pattern 52 is formed on the first insulating base layer 51 by an additive method or a subtractive method or the like.

At the same time with this, the first conductive pattern 52 corresponding to the pedestal 90 (ref: FIG. 19 (d)) is formed on the first insulating base layer 51.

An example of the material for forming the first conductive pattern 52 includes a conductive material such as copper, nickel, gold, solder, or alloys thereof. Preferably, copper is used.

The first conductive pattern 52 has a thickness in the range of, for example, 3 to 50 µm, or preferably 5 to 20 µm.

Each of the signal wires 62 and the top-side power source wire 68 have a width in the range of, for example, 5 to 200 µm, or preferably 8 to 100 µm.

A spacing between each of the signal wires 62 (spacing in the widthwise direction, hereinafter the same) is in the range of, for example, 5 to 1000 µm, or preferably 8 to 100 µm. A spacing between the signal wire 62 and the top-side power source wire 68 is in the range of, for example, 5 to 1000 µm, or preferably 8 to 100 µm.

Each of the head-side terminals 18, each of the external terminals 10 (ref: FIG. 13), and each of the supply-side terminals 36 (ref: FIG. 13) have a width in the range of, for example, 15 to 1000 µm, or preferably 20 to 800 µm.

A spacing between each of the head-side terminals 18 and a spacing between each of the external terminals 10 (ref: FIG. 13) are in the range of, for example, 15 to 1000 µm, or preferably 20 to 800 µm.

As referred in FIG. 14, the length (width) L1 in the front-rear direction of the first conductive pattern 52 corresponding to each of the first pedestals 91 is in the range of, for example, 5 to 200 µm, or preferably 10 to 150 µm. The length (length) L2 in the widthwise direction thereof is in the range of, for example, 5 to 200 µm, or preferably 10 to 150 µm. Furthermore, a spacing L3 between each of the first pedestals 91 is in the range of, for example, 50 to 300 µm, or preferably 80 to 200 µm.

In addition, the maximum length (diameter) of the first conductive pattern 52 corresponding to the second pedestal 92 is in the range of, for example, 5 to 200 µm, or preferably 10 to 150 µm. A spacing L4 in the front-rear direction between the first pedestal 91 and the second pedestal 92 is in the range of, for example, 50 to 600 µm, or preferably 100 to 200 µm.

Next, as shown in FIG. 19 (d), a varnish of the photosensitive insulating material is applied onto the first insulating base layer 51 so as to cover the first conductive pattern 52 and is then dried. Thereafter, the dried varnish is exposed to light and is then developed to be heat cured, so that the first insulating cover layer 53 is formed with the above-described pattern.

At the same time with this, the first insulating cover layer 53 corresponding to the pedestal 90 is formed on the first insulating base layer 51 so as to cover the first conductive pattern 52.

A material for forming the first insulating cover layer 53 includes the same insulating material as that for the above-described first insulating base layer 51. The first insulating cover layer 53 has a thickness in the range of, for example, 1 to 40 µm, or preferably 1 to 10 µm.

Subsequently, as shown in FIG. 19 (d), the top-side supporting layer 93 is formed on the first insulating cover layer 53 corresponding to the pedestal 90. The top-side supporting layer 93 is formed from, for example, the above-described insulating material or metal material or the like by a known forming method.

The top-side supporting layer 93 has a thickness in the range of, for example, 1 µm or more, or preferably 2 µm or more, or more preferably 3 µm or more and usually, for example, 10 µm or less. When the thickness of the top-side supporting layer 93 is below the above-described lower limit, there may be a case where the spacing in the thickness direction between the opposing region 29 to be described later and the slider 26 is not ensured sufficiently.

Next, as shown in FIG. 19 (e), each of the conduction openings 59 is formed in the metal supporting board 5.

Each of the conduction openings 59 is formed by, for example, an etching method such as a dry etching (for example, plasma etching) or a wet etching (for example, chemical etching), for example, drilling and boring, or for example, laser processing. Preferably, each of the conduction openings 59 is formed by the etching method.

In this way, the lower surface of the first insulating base layer 51 and that of the top-side conduction portion 13 are exposed from the conduction opening 59 of the metal supporting board 5.

Each of the conduction openings 59 has an inner diameter in the range of, for example, 50 to 300 µm, or preferably 100 to 250 µm.

Next, as shown in FIG. 20 (f), a varnish of the photosensitive insulating material is applied onto the lower surface of the metal supporting board 5 (including the lower surface of the first insulating base layer 51 exposed from each of the conduction openings 59 and the lower surfaces of the top-side conduction portion 13) and is then dried. Thereafter, the dried varnish is exposed to light and is then developed to be heat cured, so that the second insulating base layer 71 is formed with the above-described pattern.

A material for forming the second insulating base layer 71 includes the same insulating material as that for the above-described first insulating base layer 51.

The second insulating base layer 71 has a thickness in the range of, for example, 1 to 35 µm, or preferably 8 to 15 µm.

Each of the second base through holes 77 has a diameter in the range of, for example, 20 to 280 µm, or preferably 40 to 200 µm.

Next, as shown in FIG. 20 (*g*), the second conductive pattern 72 is formed on the lower surface of the second insulating base layer 71 by an additive method or a subtractive method or the like.

A material for forming the second conductive pattern 72 includes the same conductive material as that for the first conductive pattern 52.

The second conductive pattern 72 has a thickness in the range of, for example, 3 to 50 μm, or preferably 5 to 20 μm.

Each of the back-side power source wires 76 has a width in the range of, for example, 5 to 200 μm, or preferably 8 to 100 μm.

Each of the element-side terminals 75 has a width in the range of, for example, 15 to 1000 μm, or preferably 20 to 800 μm.

Next, as shown in FIG. 21 (*h*), a varnish of the photosensitive insulating material is applied onto the back surface of the second insulating base layer 71 so as to cover the second conductive pattern 72 on the back side and is then dried. Thereafter, the dried varnish is exposed to light and is then developed to be heat cured, so that the second insulating cover layer 73 is formed with the above-described pattern.

A material for forming the second insulating cover layer 73 includes the same insulating material as that for the above-described first insulating base layer 51. The second insulating cover layer 73 has a thickness in the range of, for example, 1 to 40 μm, or preferably 1 to 10 μm.

Next, as shown in FIG. 21 (*i*), the board opening 11 (ref: FIG. 13) and the communicating space 14 are formed in the metal supporting board 5.

The communicating space 14 and the board opening 11 are formed by, for example, the wet etching such as the chemical etching.

At this time, to form the communicating space 14, by setting the etching time to be relatively long to over etch the metal supporting board 5, the metal supporting board 5 that is disposed between the first insulating base layer 51 and the second insulating base layer 71 and corresponds to the stage 17 is etched (over etched) toward the front side, and the metal supporting board 5 that is disposed below the second insulating base layer 71 and corresponds to the basal portion 15 is etched (over etched) toward the rear side.

In this way, as shown in FIG. 16, the rear end edge 85 of the metal supporting board 5 in the stage 17 is disposed toward the front side compared to the rear end edge 65 of the first insulating base layer 51 corresponding to the stage 17 and the rear end edge 79 of the second insulating base layer 71.

That is, the rear end edge 65 of the first insulating base layer 51 and the rear end edge 79 of the second insulating base layer 71 protrude more into the communicating space 14 than the rear end edge 85 of the metal supporting board 5.

In addition, the front end edge 69 of the second insulating base layer 71 corresponding to the basal portion 15 protrudes more into the communicating space 14 than the front end edge 84 of the metal supporting board 5 in the basal portion 15.

Next, the metal supporting board 5 is cut out, so that the suspension board with circuit 1 is obtained.

Thereafter, on the upper side of the suspension board with circuit 1, the slider 26 provided with the magnetic head 27 is placed on the upper surface of the pedestal 90.

Subsequently, the solder ball 83 is provided on the head-side terminal 18 so that the solder ball 83 is in contact with a terminal (side surface terminal) of the magnetic head 27.

With this, on the lower side of the suspension board with circuit 1, the front end portion and the rear end portion of the piezoelectric element 23 are connected to the element-side front terminal 81 and the element-side rear terminal 80. That is, the solder balls 83 are provided respectively on the head-side terminal 18 and the element-side terminal 75.

The head-side terminals 18 are fixed to the magnetic head 27 and are electrically connected thereto by melting each of the solder balls 83.

In this way, the slider 26 is supported by the pedestal 90 so as to be capable of swinging (sliding) in the plane direction.

Each of the piezoelectric elements 23 is mounted on the suspension board with circuit 1 so as to be disposed between a pair of the element-side terminals 75 (the element-side front terminal 81 and the element-side rear terminal 80).

At the same time, the element-side terminal 75 is fixed to the piezoelectric element 23 and is electrically connected thereto.

As referred in FIG. 13, the external terminal 10 is electrically connected to the external circuit board 46 and the supply-side terminal 36 is electrically connected to the power source 47.

In this way, the slider 26 and the piezoelectric element 23 are mounted on the suspension board with circuit 1.

Next, the swinging of the slider 26 due to the stretching and shrinking of the piezoelectric element 23 is described with reference to FIGS. 22 and 23.

First, electric power is supplied from the power source 47 (FIG. 13) to the piezoelectric element 23 via the element-side terminal 75 and the electric voltage of the electric power is controlled, so that one of the piezoelectric elements 23 shrinks. Then, the element-side front terminal 81 and the element-side rear terminal 80 that fix one of the piezoelectric elements 23 relatively come into close contact with each other. That is, one of the element-side front terminals 81 supported by the stage 17 moves toward the rear side with respect to one of the element-side rear terminals 80 supported by the basal portion 15.

At the same time with this, electric power is supplied from the power source 47 (FIG. 13) via the element-side terminal 75 and the electric voltage of the electric power is controlled, so that the other piezoelectric element 23 stretches. Then, the element-side front terminal 81 and the element-side rear terminal 80 that fix the other piezoelectric element 23 are relatively separated from each other. That is, the other element-side front terminal 81 supported by the stage 17 moves toward the front side with respect to the other element-side rear terminal 80 supported by the basal portion 15.

In this way, the front end and the middle of the front-rear direction of the central portion 16 curve toward one side (the left side) in the widthwise direction and the stage 17 swings toward one side in the widthwise direction with respect to the rear end of the central portion 16 as a supporting point. With this, the front side portion of the slider 26 swings toward one side in the widthwise direction.

On the other hand, though not shown, when one piezoelectric element 23 stretches and the other piezoelectric element 23 shrinks, the front side portion of the slider 26 swings toward the opposite direction (the other side in the widthwise direction, the right side) to the description above.

In the suspension board with circuit 1, at the time of the swinging of the slider 26 described above, in the conductive region 2, the portion that is opposed to the slider 26 in the thickness direction is defined as the opposing region 29.

The opposing region 29 includes the conductive region 2 along the widthwise direction in the basal portion 15 and the conductive region 2 in the central portion 16.

Among the opposing region 29, the conductive region 2 along the widthwise direction in the basal portion 15 is, when projected in the thickness direction, opposed to the slider 26 after the swinging (or in the middle of the swinging) of the slider 26 while not opposed to the slider 26 before the swinging of the slider 26.

On the other hand, the upper surface of the pedestal 90 is in contact with the lower surface of the slider 26 so that the slider 26 is capable of frictionally sliding during before and after the swinging of the slider 26.

In the suspension board with circuit 1, the pedestal 90 can serve as a separating portion that separates the slider 26 from the opposing region 29 in the thickness direction at the time of the swinging of the slider 26.

Therefore, the slider 26 and the opposing region 29 are separated from each other in the thickness direction by the pedestal 90, so that damage to the opposing region 29 by the slider 26 can be prevented reliably.

In this way, it is possible to effectively prevent that the first conductive pattern 52 in the opposing region 29 and the lower surface of the slider 26 are in contact with each other.

That is, the pedestal 90 can serve as a damage preventing portion for preventing damage to the first conductive pattern 52 in the opposing region 29 by the slider 26.

In addition, the pedestal 90 is in contact with the slider 26 so that the slider 26 is capable of frictionally sliding during before and after the swinging of the slider 26, so that a smooth swinging of the slider 26 is secured and therefore, the spacing between the opposing region 29 and the slider 26 in the thickness direction can be ensured reliably.

In the embodiments in FIGS. 14 and 22, the first pedestal 91 is formed so as to extend along the widthwise direction. However, the shape thereof is not particularly limited and for example, though not shown, can be formed into a circular shape, or into a rectangular shape extending along the front-rear direction.

Preferably, the first pedestal 91 is formed so as to extend along the swinging direction of the slider 26, that is, the widthwise direction. In this way, the slider 26 that swings along the widthwise direction is supported reliably and therefore, the spacing between the opposing region 29 and the slider 26 in the thickness direction can be ensured reliably.

In the above-described embodiment, as a damage preventing portion and a separating portion, in FIG. 3, the thin-walled region 30 is provided or in FIG. 16, the pedestal 90 is provided. Alternatively, for example, though not shown, both of the thin-walled region 30 and the pedestal 90 can be provided.

In this way, the slider 26 and the opposing region 29 can be separated from each other further more reliably in the thickness direction, so that damage to the opposing region 29 by the slider 26 can be prevented further more reliably.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A suspension board with circuit, comprising:
   a conductive region in which a conductive layer is formed; and
   a mounting region for mounting a slider on which a magnetic head that is electrically connected to the conductive layer is mounted,
   wherein the mounting region is configured to mount the slider so that the slider is operative to undergo relative movement with respect to the conductive region, and
   wherein the conductive region includes an opposing region that is opposed to the slider in a thickness direction at the time of the relative movement of the slider with respect to the conductive region; and
   a damage preventing portion for preventing damage to the opposing region by preventing contact with the slider on condition that the slider has moved so as to overlap with respect to the opposing region of the conductive region in the thickness direction.

2. The suspension board with circuit according to claim 1, wherein
   the damage preventing portion is a separating portion that separates the slider that relatively moves with respect to the conductive region from the opposing region in the thickness direction.

3. The suspension board with circuit according to claim 1, wherein the relative movement of the slider with respect to the conductive region comprises the slider swinging toward one side in a widthwise direction or toward an opposite side in the widthwise direction.

4. The suspension board with circuit according to claim 1, wherein at least a part of the conductive region overlaps with the mounting region in the thickness direction.

5. The suspension board with circuit according to claim 2, wherein
   the separating portion is a thin-walled region whose thickness is thinner than that of the conductive region other than the opposing region.

6. The suspension board with circuit according to claim 2, wherein
   the separating portion is a pedestal for supporting the slider so that the slider is operative to undergo relative movement.

7. The suspension board with circuit according to claim 5, wherein
   the mounting region mounts the slider so that one end of the slider is fixed and the other end thereof is operative to undergo relative movement with respect to the conductive region, and
   the thin-walled region is, when projected in the thickness direction, opposed to the other end of the slider at the time of the relative movement with respect to the conductive region.

8. The suspension board with circuit according to claim 5, wherein
   the conductive region includes an insulating base layer, the conductive layer that is formed on the insulating base layer, and an insulating cover layer that is formed on the insulating base layer so as to cover the conductive layer; and
   the thickness of at least one-layer that is selected from a group consisting of the insulating base layer, the conductive layer, and the insulating cover layer in the thin-walled region is thinner than that of at least the one-layer in the conductive region other than the opposing region.

9. The suspension board with circuit according to claim 6, wherein
   the pedestal is in contact with the slider so that the slider is operative to frictionally slide during the relative movement of the slider.

10. The suspension board with circuit according to claim 9, wherein
    the pedestal is formed so as to extend along the moving direction of the slider.

\* \* \* \* \*